(12) United States Patent
Li et al.

(10) Patent No.: US 11,937,305 B2
(45) Date of Patent: Mar. 19, 2024

(54) RANDOM ACCESS CONFIGURATION METHOD AND APPARATUS, RANDOM ACCESS METHOD AND APPARATUS, AND BASE STATION

(71) Applicant: BEIJING XIAOMI MOBILE SOFTWARE CO., LTD., Beijing (CN)

(72) Inventors: Mingju Li, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 633 days.

(21) Appl. No.: 17/259,495

(22) PCT Filed: Jul. 11, 2018

(86) PCT No.: PCT/CN2018/095303
§ 371 (c)(1),
(2) Date: Jan. 11, 2021

(87) PCT Pub. No.: WO2020/015048
PCT Pub. Date: Jan. 16, 2020

(65) Prior Publication Data
US 2021/0274561 A1    Sep. 2, 2021

(51) Int. Cl.
*H04W 74/08* (2009.01)
*H04W 56/00* (2009.01)

(52) U.S. Cl.
CPC ..... *H04W 74/0833* (2013.01); *H04W 56/001* (2013.01); *H04W 74/0808* (2013.01)

(58) Field of Classification Search
CPC ........... H04W 74/0833; H04W 56/001; H04W 74/0808; H04W 72/23; H04W 74/0891;
(Continued)

(56) References Cited

U.S. PATENT DOCUMENTS 9,220,095 B2   12/2015 Tsuboi et al.
11,375,527 B1 *  6/2022 Eyuboglu .......... H04B 7/15528
(Continued)

FOREIGN PATENT DOCUMENTS

CN    103493576 A    1/2014
CN    105704834 A    6/2016
(Continued)

OTHER PUBLICATIONS

Ericsson, "Preamble allocation when several SSBs are mapped to one RO", 3GPP TSG-RAN WG2 AH 1807 R2-1810078, Montreal, Canada, Jul. 2-6, 2018, (4p) (Year: 2018).*
(Continued)

*Primary Examiner* — Lan-Huong Truong
(74) *Attorney, Agent, or Firm* — Arch & Lake LLP

(57) ABSTRACT

Provided are a Random Access (RA) configuration method and apparatus, an RA method and apparatus, a base station, User Equipment (UE) and a computer-readable storage medium. The RA configuration method may include: grouping multiple Synchronization Signal Blocks (SSBs) and selecting a primary SSB from each SSB group; sending UE indication information indicating a primary SSB to be sent in an SSB group to be sent; sending at most one SSB in each SSB group to be sent to the UE; and sending the number of SSBs corresponding to preambles in each RA Channel (RACH) Occasion (RO) and the number of ROs under Frequency Division Multiplexing (FDM) to the UE.

19 Claims, 12 Drawing Sheets

(58) Field of Classification Search
CPC .. H04W 74/004; H04W 48/10; H04L 5/0053; H04L 5/0094; H04L 5/0048; H04J 11/0069; Y02D 30/70
See application file for complete search history.

(56) References Cited

U.S. PATENT DOCUMENTS

| | | | |
|---|---|---|---|
| 2014/0029595 | A1 | 1/2014 | Tsuboi et al. |
| 2017/0223738 | A1 | 8/2017 | Seo et al. |
| 2019/0357262 | A1* | 11/2019 | Cirik ............. H04W 76/27 |
| 2019/0387546 | A1 | 12/2019 | Li et al. |
| 2021/0112602 | A1* | 4/2021 | Li .............. H04W 74/008 |
| 2023/0042274 | A1* | 2/2023 | He ............. H04W 74/0841 |

FOREIGN PATENT DOCUMENTS

| | | |
|---|---|---|
| CN | 106664729 A | 5/2017 |
| CN | 106788912 A | 5/2017 |
| IN | 108012329 A | 5/2018 |
| RU | 2596802 C2 | 9/2016 |
| WO | 2018049274 A1 | 3/2018 |
| WO | 2018110857 A1 | 6/2018 |
| WO | 2018123468 A1 | 7/2018 |
| WO | 2019240549 A1 | 12/2019 |

OTHER PUBLICATIONS

Extended European Search Report in European Application No. 18926255.3, dated Jun. 29, 2021, (10p).

Notice of Allowance of the Russian Application No. 2021102906, dated Jul. 13, 2021, (23p).

Interdigital Inc: "On Synchronization Signal and PBCH for NR Unlicensed Spectrum", 3GPP TSG RAN WG1 Meeting #92bis, R1-1804886, Sanya, China, Apr. 16-20, 2018, (4p).

ZTE: "WF on Random Access Association Configuration", 3GPP TSG RAN WG1 NR Ad-Hoc#2, R1-1711799, Qingdao, China Jun. 27-30, 2017, (14p).

Nokia: "RACH in Multibeam System", 3GPP TSG-RAN WG2, Meeting #97bis, R2-1703553, Spokane, WA, Apr. 3-7, 2017, (5p).

International Search Report to PCT/CN2018/095303 dated Feb. 13, 2019 with English translation, (4p).

International Search Report and Written Opinion in the International Application No. PCT/CN2018/095303, dated Feb. 13, 2019 with English translation, (6p).

InterDigital Inc., "Considerations on Synchronization Signal for NR Unlicensed Spectrum", 3GPP TSG RAN WG1 Meeting 92, R1-1802647, Athens, Greece, Feb. 26-Mar. 2, 2018, (3p).

Ericsson, "Preamble allocation when several SSBs are mapped to one RO", 3GPP TSG-RAN WG2 AH 1807 R2-1810078, Montreal, Canada, Jul. 2-6, 2018, (4p).

Office Action of the Indian application No. 202147005181, dated Jan. 17, 2022, (6 pages).

* cited by examiner

RANDOM ACCESS CONFIGURATION METHOD AND APPARATUS, RANDOM ACCESS METHOD AND APPARATUS, AND BASE STATION

CROSS REFERENCE TO RELATED APPLICATION

This application is the US national stage of International Patent Application No. PCT/CN2018/095303 filed on Jul. 11, 2018, the content of which is incorporated herein by reference it its entirety for all purposes.

TECHNICAL FIELD

The present disclosure relates to the technical field of communications, and more particularly, to a Random Access (RA) configuration method and apparatus, an RA method and apparatus, a base station, User Equipment (UE) and a computer-readable storage medium.

BACKGROUND

For licensed spectrums of New Radio (NR), each slot includes 14 symbols, and the number of slots in 1 ms is determined based on a sub-carrier interval. For example, one slot is in 1 ms when the sub-carrier interval is 15 KHz, two slots are in 1 ms when the sub-carrier interval is 30 KHz, four slots are in 1 ms when the sub-carrier interval is 60 KHz, and so on.

In the NR, for reducing reference signals that are always on to decrease the overhead, a Synchronization Signal Block (SSB) is proposed. Each SSB takes up four continuous symbols that are a Primary Synchronization Signal (PSS), a Physical Broadcast Channel (PBCH), a Secondary Synchronization Signal (SSS) and the PBCH respectively in sequence. For positions of symbols where the SSBs are located, 12 Resource Blocks (RBs) in the middle are the SSSs and 4 RBs on two sides are the PBCHs. Some sub-carriers in the PBCHs are Demodulation Reference Signals (DMRSs). The sub-carrier interval of the SSB may be 15 KHz, 30 KHz, 120 KHz or 240 KHz. All SSBs are sent within 5 ms. In order to support beam transmission, when there is a beam or beams, each beam needs to send the SSB. Hence, 4 SSBs (when a carrier frequency is 3 GHz or less) or 8 SSBs (when the carrier frequency is between 3 GHz and 6 GHz) or 64 SSBs (when the carrier frequency is 6 GHz or more) at maximum can be sent within 5 ms.

When UE performs initial synchronization with a base station, the UE may detect an SSB sent by the base station and obtain an index of the SSB and thus obtain positions of symbols where the SSB is located. Therefore, the UE and the base station realize downlink symbol synchronization. In order to realize uplink synchronization, the UE needs to send a preamble of Random Access (RA). However, how to select the preamble and which Random Access Channel (RACH) Occasion (RO) the preamble is sent in are determined based on an SSB received by a user, an SSB actually sent by the base station and a position set of the RO. Upon detecting, based on the received SSB, the SSB actually sent by the base station and the position set of the RO, an RO corresponding to the SSB and a corresponding preamble, the UE may use the corresponding RO and preamble to initiate RA to the base station.

In the licensed spectrums of the NR, SSBs planned by the base station for transmission may all be transmitted. Nevertheless, in unlicensed spectrums of the NR, channel detection needs to be performed before each SSB is transmitted, and the SSB cannot be transmitted until a channel is idle. For example, in a case where the base station plans to transmit N SSBs, the base station is required to perform channel detection before the N SSBs are transmitted, and subsets of the N SSBs are transmitted absolutely at last. The UE needs to determine, an RO and a preamble corresponding to a received SSB based on the value of N and the number of SSBs in each RO. However, corresponding ROs and preambles are also allocated by the base station for SSBs that are originally planned to be transmitted and cannot be transmitted due to a failure in channel detection, thereby causing a waste of resources.

SUMMARY

In view of this, the present disclosure provides an RA configuration method and apparatus, an RA method and apparatus, a base station, UE and a computer-readable storage medium, to improve the utilization rate of RO resources, thereby improving the success rate of RA of the UE.

According to a first aspect of the present disclosure, a method for RA configuration is provided, which may be applicable to a base station and include that:

multiple SSBs are grouped and a primary SSB is selected from each SSB group;

indication information is sent to UE, the indication information indicating a primary SSB to be sent in an SSB group to be sent;

at most one SSB in each SSB group to be sent is sent to the UE; and the number of SSBs corresponding to preambles in each RO and the number of ROs under Frequency Division Multiplexing (FDM) are sent to the UE.

According to a second aspect of the present disclosure, an RA method is provided, which may be applicable to UE and include that:

an SSB sent by a base station is received and detected;

a primary SSB in an SSB group corresponding to the detected SSB is determined;

indication information sent by the base station is received, and an SSB to be sent by the base station is determined based on the indication information;

the number of SSBs corresponding to preambles in each RO and the number of ROs under FDM are received from the base station, and corresponding RO and preamble of the primary SSB are determined based on the SSB to be sent by the base station, a position of the primary SSB in the SSB to be sent by the base station, the number of SSBs corresponding to the preambles in each RO and the number of ROs under the FDM; and the corresponding preamble is sent to the base station on the determined RO to realize RA to the base station.

According to a third aspect of the present disclosure, an RA configuration apparatus is provided, which may be applicable to a base station, and include:

a grouping and selecting module, configured to group multiple SSBs and select a primary SSB from each SSB group;

a first sending module, configured to send indication information to UE, the indication information indicating a primary SSB selected by the grouping and selecting module in an SSB group to be sent;

a second sending module, configured to send at most one SSB in each SSB group to be sent to the UE; and a third sending module, configured to send the number of SSBs corresponding to preambles in each RO and the number of ROs under FDM to the UE.

According to a fourth aspect of the present disclosure, an RA apparatus is provided, which may be applicable to UE and include:

a receiving and detecting module, configured to receive and detect an SSB from a base station;

a determining module, configured to determine a primary SSB in an SSB group corresponding to the SSB detected by the receiving and detecting module;

a first receiving and determining module, configured to receive indication information from the base station, and determine, based on the indication information, an SSB to be sent by the base station;

a second receiving and determining module, configured to receive the number of SSBs corresponding to preambles in each RO and the number of ROs under FDM from the base station, and determine corresponding RO and preamble of the primary SSB based on the SSB determined by the first receiving and determining module and to be sent by the base station, a position of the primary SSB determined by the determining module in the SSB to be sent by the base station, the number of SSBs corresponding to the preambles in each RO and the number of ROs under the FDM; and an access module, configured to send the corresponding preamble to the base station on the RO determined by the second receiving and determining module to realize RA to the base station.

According to a fifth aspect of the present disclosure, a base station is provided, which may include:

a processor; and a memory, configured to store instructions executable by the processor, wherein the processor is configured to:

group multiple SSBs and select a primary SSB from each SSB group;

send indication information to UE, the indication information indicating a primary SSB to be sent in an SSB group to be sent;

send at most one SSB in each SSB group to be sent to the UE; and send the number of SSBs corresponding to preambles in each RO and the number of ROs under FDM to the UE.

According to a sixth aspect of the embodiments of the present disclosure, UE is provided, which may include:

a processor; and a memory, configured to store instructions executable by the processor, wherein the processor is configured to:

receive and detect a Synchronization Signal Block (SSB) from a base station;

determine a primary SSB in an SSB group corresponding to the detected SSB;

receive indication information from the base station, and determine, based on the indication information, an SSB to be sent by the base station;

receive the number of SSBs corresponding to a preambles in each Random Access Channel (RACH) Occasion (RO) and the number of ROs under Frequency Division Multiplexing (FDM) from the base station, and determine corresponding RO and preambles corresponding toof the primary SSB based on the SSB to be sent by the base station, a position of the primary SSB in the SSB to be sent by the base station, the number of SSBs corresponding to the preambles in each RO and the number of ROs under the FDM; and send the corresponding preamble to the base station on the determined RO to realize RA to the base station.

According to a seventh aspect of the embodiments of the present disclosure, a computer-readable storage medium is provided, which stores computer instructions. The instructions can be executed by a processor to implement the operations of the method for RA configuration.

According to an eighth aspect of the embodiments of the present disclosure, a computer-readable storage medium is provided, which stores computer instructions. The instructions can be executed by a processor to implement the operations of the method for RA.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
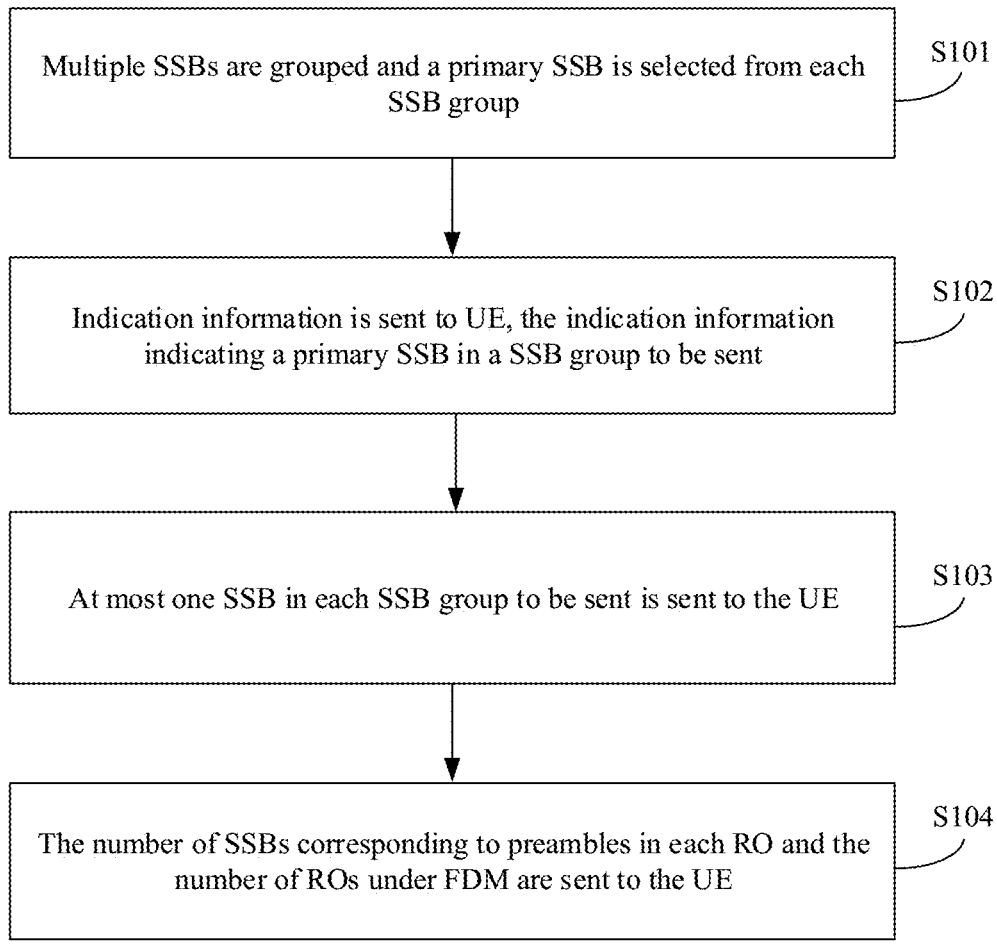
FIG. 1 illustrates a flowchart of an RA configuration method according to an exemplary embodiment of the present disclosure.

FIG. 1 illustrates a flowchart of an RA configuration method according to an exemplary embodiment of the present disclosure. The embodiment is described from a base station side. As shown in FIG. 1, the RA configuration method may include the following operations.

In operation S101, multiple SSBs are grouped and a primary SSB is selected from each SSB group.

Optionally, before the multiple SSBs are grouped and the primary SSB is selected from each SSB group, the method may further include that a grouping rule and a primary SSB selecting rule are defaulted, or the method may also include that a grouping rule and a primary SSB selecting rule are determined and the grouping rule and the primary SSB selecting rule are sent to UE.

The grouping rule may include but not limited to at least one of: the number of beams, the number of the multiple SSBs, time-domain position distribution information of the multiple SSBs, a window size or a channel condition.

For example, the grouping may be performed based on the number of beams, or the grouping may be performed based on the number of multiple SSBs planned by the base station for transmission (that is, to be sent by the base station). Four continuous SSBs or two continuous SSBs may be classified into one group based on the time-domain position distribution information of the multiple SSBs, or SSBs in a 1-ms window may be classified into one group, or more SSBs may be classified into one group when SSBs have worse channel conditions. In this way, the occasion that one SSB in each group is sent may be increased and thus a waste of RO resources can be reduced.

The primary SSB selecting rule may include but not limited to that an SSB in each group is defaulted as the primary SSB. For example, a first SSB in each group may be defaulted as the primary SSB, or a last SSB in each group may be defaulted as the primary SSB.

In the embodiment, grouping the multiple SSBs may include the following two cases.

First case is that SSB indexes of the multiple SSBs are different.

In this case, the multiple SSBs may be grouped according to the grouping rule.

For example, when a sub-carrier interval is 30 KHz and a carrier frequency is between 3 GHz and 6 GHz, there may be eight sendable positions at most for the SSBs, with SSB numbers from 0 to 7. Every four SSBs may be classified into one group and there are two groups in total, such as SSB #0-3 serving as a first group and SSB #4-7 serving as a second SSB group. In addition, SSB #0 and SSB #4 may serve as the primary SSBs of the two SSB groups respectively.

Second case is that SSB indexes of the multiple SSBs are the same.

With regard to the second case, in the embodiment, before the operation S101 is executed, the method may further include that: at least one SSB is selected from the multiple SSBs as a target SSB, and multiple sendable positions for each target SSB are obtained. The multiple sendable positions for each target SSB may be obtained in following two manners.

Manner 1) is cyclic shift: based on a position where a set signal configured to determine an index of each target SSB is located, cyclic shift that is of a symbol level is performed on other signals than the set signal in each target SSB to obtain the multiple sendable positions for each target SSB, wherein the set signal has a same position in the multiple sendable positions with a position in the target SSB.

The set signal may include but not limited to a PSS, an SSS or a PBCH located in the SSB.

Figure 2:
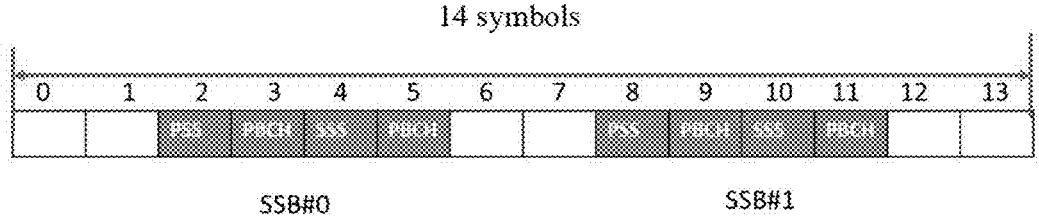
FIG. 2 illustrates a schematic diagram of positions of symbols where an SSB is located according to an exemplary embodiment of the present disclosure.

For instance, the SSB #0 shown in FIG. 2 is used as an example to describe a process for obtaining multiple sendable positions for the SSB #0. The positions of the SSB #0 shown in FIG. 2 are initial sendable positions for the SSB #0.

When the set signal is the PSS, based on the position where the set signal is located, that is, the symbol 2, the cyclic shift that is of the symbol level may be performed on other signals than the set signal in the primary SSB to obtain the multiple sendable positions for the SSB as below:

position 11) corresponding to symbols 0-3, signals sent by the symbols 0-3 respectively being: SSS, PBCH, PSS and PBCH;

position 12) corresponding to symbols 1-4, signals sent by the symbols 1-4 respectively being: PBCH, PSS, PBCH and SSS; and position 13) corresponding to symbols 2-5, the symbols 2-5 being initial sendable positions for the SSB #0 and the transmitted signals respectively being: PSS, PBCH, SSS and PBCH.

It is to be noted that as the SSB #0 is used as an example herein and the SSB cannot be sent before a 5-ms window, the case where the PSS is at the last cannot be obtained after the SSB #0 takes the PSS as the set signal to subject to the cyclic shift, and the case where the PSS is at the last is available to the SSB at other positions.

For example, when the set signal in the SSB #1 is the PSS, there may be another position that is symbols 5-8. Signals sent by the symbols 5-8 respectively are: PBCH, SSS, PBCH and PSS, that is, the PSS is the last symbol in the four symbols.

As can be seen from the obtained multiple sendable positions, the position where the PSS is located in the multiple sendable positions is the same and always located at the position of the symbol 2. As the SSB indexes corresponding to the multiple sendable positions are determined by a position of a symbol where the PSS is located, the SSB indexes corresponding to the multiple sendable positions are the same.

When the set signal is the SSS, based on the position where the set signal is located, that is, the symbol 4, the cyclic shift that is of the symbol level may be performed on other signals than the set signal in SSB #0 to obtain the multiple sendable positions for the SSB:

position 21) corresponding to symbols 1-4, signals sent by the symbols 1-4 respectively being: PBCH, PSS, PBCH and SSS;

position 22) corresponding to symbols 2-5, signals sent by the symbols 2-5 respectively being: PSS, PBCH, SSS and PBCH;

position 23) corresponding to symbols 3-6, signals sent by the symbols 3-6 respectively being: PBCH, SSS, PBCH and PSS; and position 24) corresponding to symbols 4-7, signals sent by the symbols 4-7 respectively being: SSS, PBCH, PSS and PBCH.

As can be seen from the obtained multiple sendable positions, the position where the SSS is located in the multiple sendable positions is the same and always located at the position of the symbol 4. As the SSB indexes at the multiple sendable positions are determined by a position of a symbol where the SSS is located, the SSB indexes corresponding to the multiple sendable positions are the same.

In this case, each target SSB and multiple SSBs corresponding to the multiple sendable positions obtained after the cyclic shift may be classified into one group.

Manner 2) is overall shifting: signals in each target SSB are overall shifted based on a position of each target SSB to obtain the multiple sendable positions for each target SSB.

Optionally, a corresponding offset may be determined based on an overall offset between each sendable position and an initial sendable position.

In order to clearly describe the processes for obtaining the multiple sendable positions and determining the offset, the SSB #0 shown in FIG. 2 is still used as an example below for description. By overall shifting signals in the SSB #0 shown in FIG. 2, the following multiple sendable positions may be obtained:

position 31) corresponding to symbols 0-3, signals sent by the symbols 0-3 respectively being: PSS, PBCH, SSS and PBCH, and the position being deviated forward by two symbols relative to the initial sendable position, that is, the offset being −2.

position 32) corresponding to symbols 1-4, signals sent by the symbols 1-4 respectively being: PSS, PBCH, SSS and PBCH, and the position being deviated forward by one symbol relative to the initial sendable position, that is, the offset being −1;

position 33) corresponding to symbols 2-5 being initial sendable position, and the offset being 0;

position 34) corresponding to symbols 3-6, signals sent by the symbols 3-6 respectively being: PSS, PBCH, SSS and PBCH, and the position being deviated backward by one symbol relative to the initial sendable position, that is, the offset being 1; and position 35) symbols 4-7, signals sent by the symbols 4-7 respectively being: PSS, PBCH, SSS and PBCH, and the position being deviated backward by two symbols relative to the initial sendable position, that is, the offset being 2.

Therefore, the multiple sendable positions may be obtained in the above manner. However, the more the sendable positions, the greater the offset, and the greater the number of bits for indicating the offset. In the embodiment, the offset may be limited, for example, only deviating backward by M symbols, or only deviating forward by N symbols, or the like, wherein both the M and the N are an integer value greater than or equal to 0 and smaller than or equal to an X, and the X may be set as required and may be smaller than or equal to 8 for example. In the embodiment, by limiting the offset, the number of bits increased due to signaling of the base station for indicating the offset can be as less as possible, thereby saving the signaling overhead of PBCH.

In this case, each target SSB and multiple SSBs corresponding to the multiple sendable positions obtained after the each target SSB being subjected to the overall shifting may be classified into one group.

In operation S102, indication information is sent to UE, the indication information indicating a primary SSB to be sent in an SSB group to be sent.

After a primary SSB is selected from each SSB group, the indication information may be sent to the UE to indicate the primary SSB in the SSB group to be sent, such that the UE may know based on the indication information which SSBs are to be sent.

Supposing that SSB #0 and SSB #4 are respective primary SSBs in the two SSB groups and the indication information indicates the SSB #0 and the SSB #4, the UE may know based on the indication information that the SSBs to be sent by the base station are the SSB #0 and the SSB #4; and further, the UE may know that the SSBs to be sent by the base station may be any SSB in the same group as the SSB #0 and any SSB in the same group as the SSB #4.

In operation S103, at most one SSB in each SSB group to be sent is sent to the UE.

Figure 3:
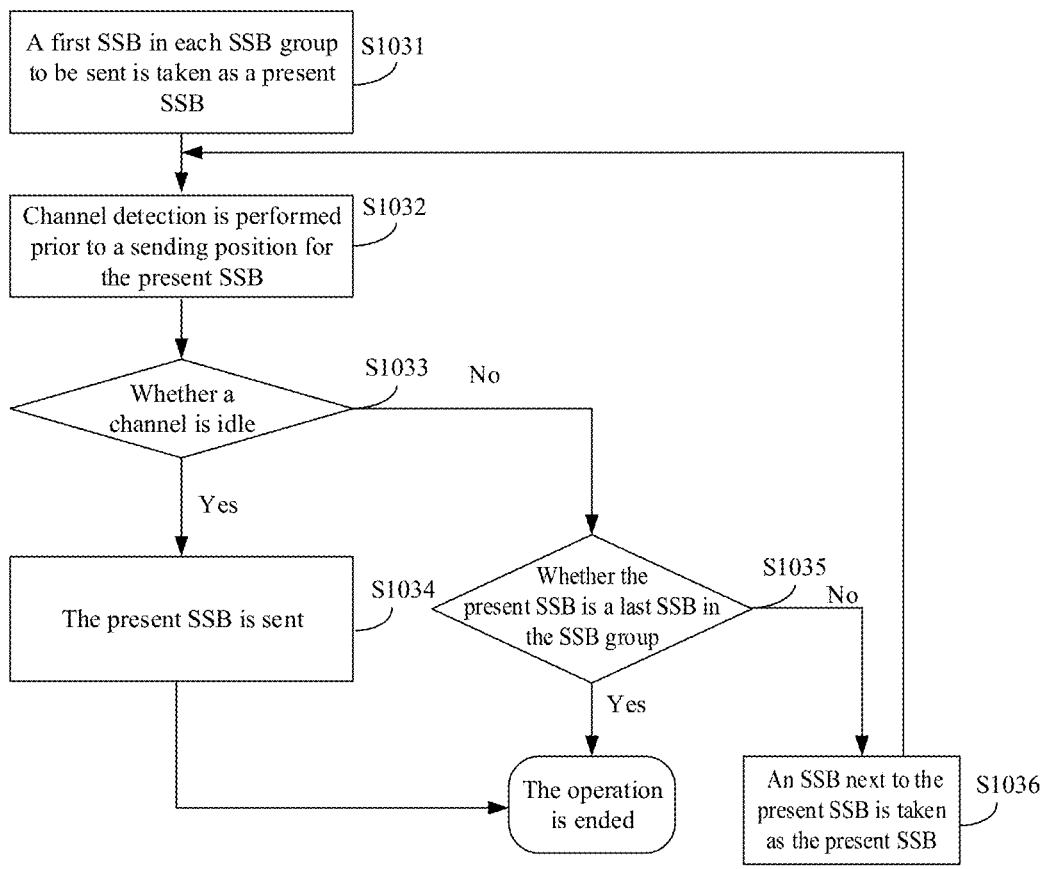
FIG. 3 illustrates a flowchart of sending at most one SSB in each SSB group to be sent to UE according to an exemplary embodiment of the present disclosure.

The base station may at most send one SSB based on a busy-idle condition of a channel in each SSB group. As shown in FIG. 3, the process may include the following operations.

In operation S1031, a first SSB in each SSB group to be sent is taken as a present SSB.

In operation S1032, channel detection is performed prior to a sending position for the present SSB.

In operation S1033, whether a channel is idle is determined; when the channel is idle, S1034 may be executed; and when the channel is busy, S1035 may be executed.

In operation S1034, the present SSB is sent, and the operation is ended.

In operation S1035, whether the present SSB is a last SSB in the SSB group is determined; when the present SSB is not the last SSB, S1036 may be executed; and when the present SSB is the last SSB, the operation is ended.

In operation S1036, an SSB next to the present SSB is taken as the present SSB, and the operation S1032 is continuously executed.

In the embodiment, waste of RO resources can be subsequently decreased by sending at most one SSB in each SSB group to be sent to the UE.

In operation S104, the number of SSBs corresponding to preambles in each RO and the number of ROs under FDM are sent to the UE.

In the embodiment, multiple SSBs may be grouped and at most one SSB in each SSB group to be sent may be sent to the UE, so that each SSB in the SSB groups can correspond to an RO resource, that is, the number of RO resources corresponding to each SSB is increased, and thus the utilization rate of RO resources is improved, and the success rate of RA of the UE is improved.

Figure 4:
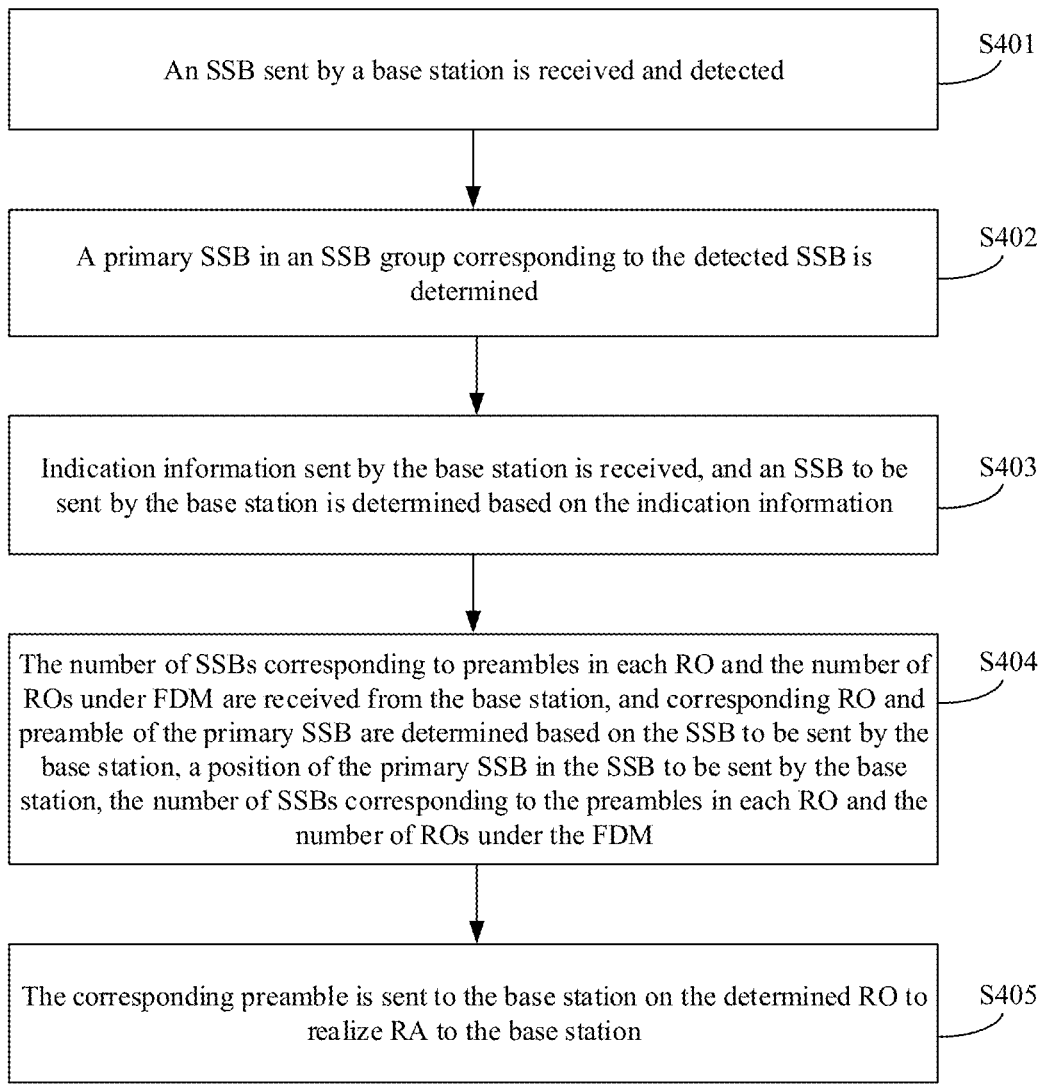
FIG. 4 illustrates a flowchart of an RA method according to an exemplary embodiment of the present disclosure.

FIG. 4 illustrates a flowchart of an RA method according to an exemplary embodiment of the present disclosure. The embodiment is described from a UE side. As shown in FIG. 4, the method may include the following operations.

In operation S401, an SSB sent by a base station is received and detected.

As the base station may select, before grouping SSBs, at least one SSB from multiple SSBs as a target SSB and obtain multiple sendable positions for each target SSB, the UE may detect the SSBs upon the reception of the SSBs to obtain an SSB corresponding to a sendable position.

Figure 5:
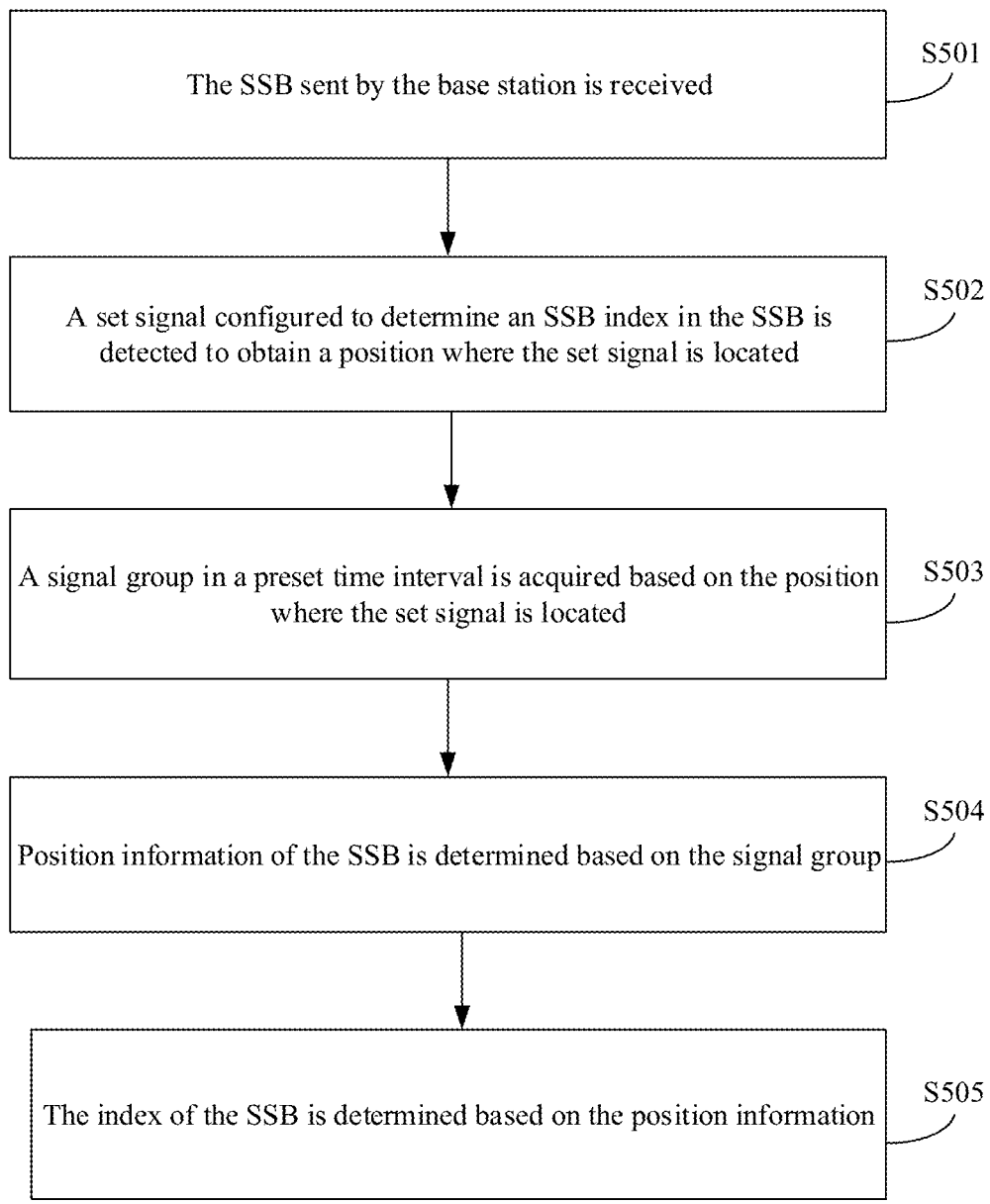
FIG. 5 illustrates a flowchart of receiving and detecting an SSB from a base station according to an exemplary embodiment of the present disclosure.

As shown in FIG. 5, the operation that the SSB sent by the base station is received and detected may include the following operations.

In operation S501, the SSB sent by the base station is received.

In operation S502, a set signal configured to determine an SSB index in the SSB is detected to obtain a position where the set signal is located.

The set signal may be determined in a variety of manners. For example, the signal in the SSB may be determined as the set signal, that is, the set signal in any case is the same; or a different signal in the SSB may also be determined as the set signal based on a sending frequency or sub-carrier interval of the SSB.

In operation S503, a signal group in a preset time window is acquired based on the position where the set signal is located.

The operation that the signal group in the preset time window is acquired based on the position where the set signal is located may include that: a first signal group in a first preset time window and a second signal group in a second preset time window are acquired based on the position where the set signal is located. The first preset time window is located prior to the position where the set signal is located, and the second preset time window is located after the position where the set signal is located. The first signal group, the second signal group and the set signal form the above signal group.

Figure 6:
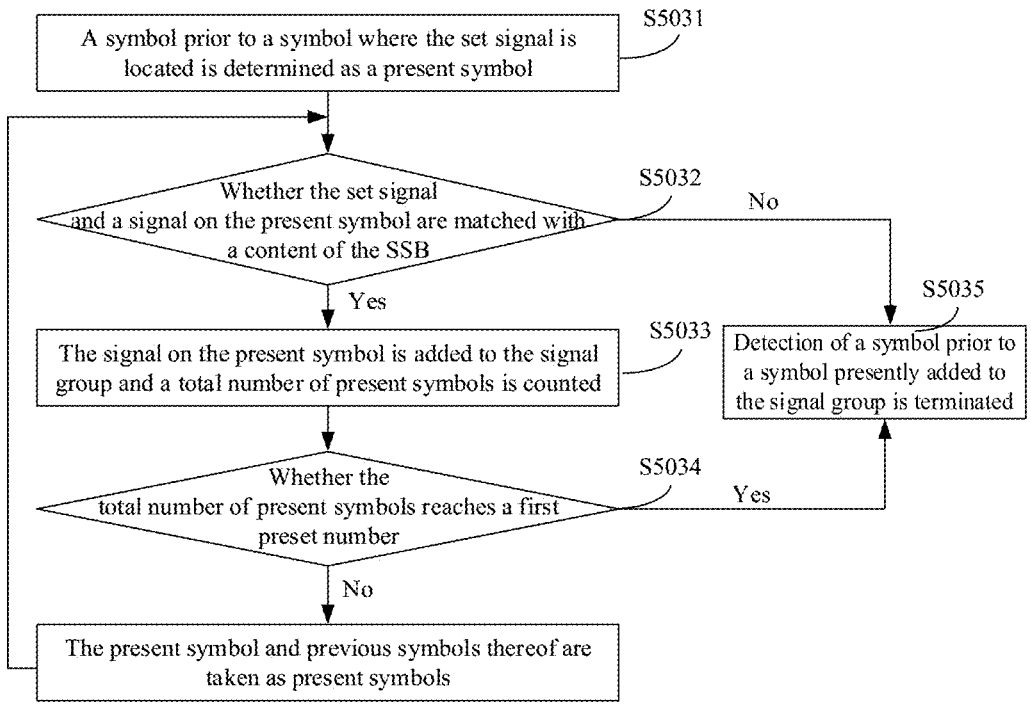
FIG. 6 illustrates a flowchart of acquiring a first signal group according to an exemplary embodiment of the present disclosure.

As shown in FIG. 6, the operation that the first signal group in the first preset time window is acquired based on the position where the set signal is located may include the following operations.

In operation S5031, a symbol prior to a symbol where the set signal is located is determined as a present symbol.

In operation S5032, whether the set signal and a signal on the present symbol are matched with a content of the SSB is determined; when matched, operation S5033 may be executed; and when not matched, operation S5035 may be executed.

The content of the SSB may include a content of the SSB before the SSB is subjected to cyclic shift and a content of the SSB after the SSB is subjected to the cyclic shift.

In operation S5033, the signal on the present symbol is added to the signal group and a total number of present symbols is counted.

In a case where a signal newly added to the signal group and a previous signal have a repeated signal, the repeated signal may be removed, that is, only a non-repeated signal is added.

In operation S5034, whether the total number of present symbols reaches a first preset number is determined; when the total number does not reach the first preset number, the present symbol and a symbol prior to the present symbol are taken as the present symbols, and operation S5032 may be repeatedly executed; and when the total number reaches the first preset number, operation S5035 may be executed.

The first preset number may be 3.

In operation S5035, detection of a symbol prior to a symbol presently added to the signal group is terminated.

The process for acquiring the second signal group in the second preset time window based on the position where the set signal is located is the same as the process for acquiring the first signal group, provided that "a symbol prior to the symbol where the set signal is located" in the above operation is replaced with "a symbol after the symbol where the set signal is located", which will not elaborated herein. It is to be noted that in the case where the second signal group is acquired, the first preset number may be greater than 3, such as 15.

In order to more clearly describe the process for acquiring the signal group, the description will be made below in combination with the embodiment shown in FIG. 7. Supposing that the set signal is the PSS located at symbol #8, the process for acquiring the signal group is as follows:

With regard to symbols prior to the symbol #8, the symbol #7 is taken as the present symbol, and upon the determination that the set signal PSS and the signal PBCH at the symbol #7 are matched with contents of other SSBs (because the position of the PSS is unchanged, with the cyclic shift on other signals, the PBCH may be prior to the symbol where the PSS signal is located, such as the above-mentioned position 11) and position 12)), the signal PBCH corresponding to the symbol #7 may be added to the signal group, and the total number of present symbols is counted to be 1. As the total number of present symbols does not reach the first preset number 3, the symbol #7 and the symbol #6 are taken as the present symbols, and upon the determination that the set signal PSS, the signal PBCH at the symbol #7 and the signal SSS at the symbol #6 are matched with the contents of other SSBs (likewise, as the position of the PSS is unchanged, with the cyclic shift on other signals, the contents sent by continuous three symbols may be SSS-PBCH-PSS, such as the above-mentioned position 11)), the signal PBCH at the symbol #7 and the signal SSS at the symbol #6 may be added to the signal group. As the signal group includes the signal PBCH corresponding to the symbol #7, only the signal SSS at the symbol #6 may be added to the signal group, and the total number of present symbols is counted to be 2. As the total number of present symbols does not reach the first preset number 3, the symbol #7 to the symbol #5 are taken as the present symbols, and upon the determination that the set signal PSS, the signal PBCH at the symbol #7, the signal SSS at the symbol #6 and the signal PBCH at the symbol #5 are matched with the contents of other SSBs (likewise, as the position of the PSS is unchanged, with the cyclic shift on other signals, the contents sent by continuous four symbols may be PBCH-SSS-PBCH-PSS, such as the above-mentioned position 23)), the signal PBCH at the symbol #7, the signal SSS at the symbol #6 and the signal PBCH at the symbol #5 may be added to the signal group. As the signal group includes the signal PBCH corresponding to the symbol #7 and the signal SSS at the symbol #6, only the signal PBCH at the symbol #5 may be added to the signal group and the total number of present symbols is counted to be 3. As the total number of present symbols reaches the first preset number 3, the detection of the symbol prior to the symbol #5 is terminated, and the first signal group is PBCH-SSS-PBCH on the symbols #5-#7.

With regard to symbols after the symbol #8, the symbol #9 is taken as the present symbol, and upon the determination that the set signal PSS and the signal PBCH at the symbol #9 are matched with the content of the primary SSB (a symbol where the PBCH is located is after the symbol where the PSS is located, that is, the position 13 which is with reference to the symbol position of the primary SSB), the signal PBCH corresponding to the symbol #9 may be added to the signal group, and the total number of present symbols is counted to be 1. As the total number of present symbols does not reach the first preset number 15, the symbol #9 and the symbol #10 are taken as the present symbols, and upon the determination that the set signal PSS, the signal PBCH at the symbol #9 and the signal at the symbol #10 are not matched with the contents of other SSBs, the detection of the symbol after the symbol #9 is terminated, and the second signal group is the PBCH at the symbol #9.

By means of the above process, the acquired signal group is the signal at the symbol #5 to the signal at the symbol #9, that is, PBCH-SSS-PBCH-PSS-PBCH.

Figure 8:
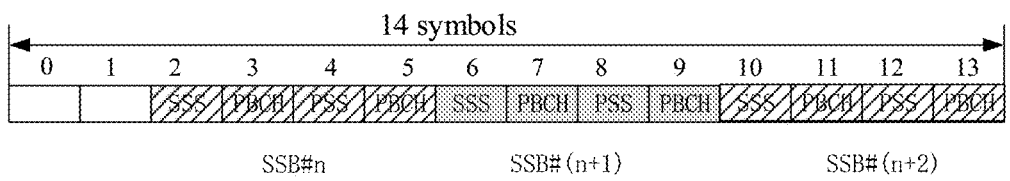
FIG. 8 illustrates a schematic diagram of positions of symbols where an SSB is located according to an exemplary embodiment of the present disclosure.

Also for example, an SSS of a second SSB in FIG. 8 (that is, the SSS at the symbol #6) is taken as the set signal. The signal group that may be acquired through the above process is the signal at the symbol #3 to the signal at the symbol #13.

In the embodiment, whether the signal on the present symbol and the set signal are matched with the content of the SSB is determined; when matched, the present symbol may be added to the signal group and the above operation may be repeated till the number of present symbols reaches the first preset number; otherwise, when not matched, the detection of the symbol prior to or after the symbol presently added to the signal group is terminated, thereby acquiring the signal group.

In operation S504, position information of the SSB is determined based on the signal group.

Figure 9:
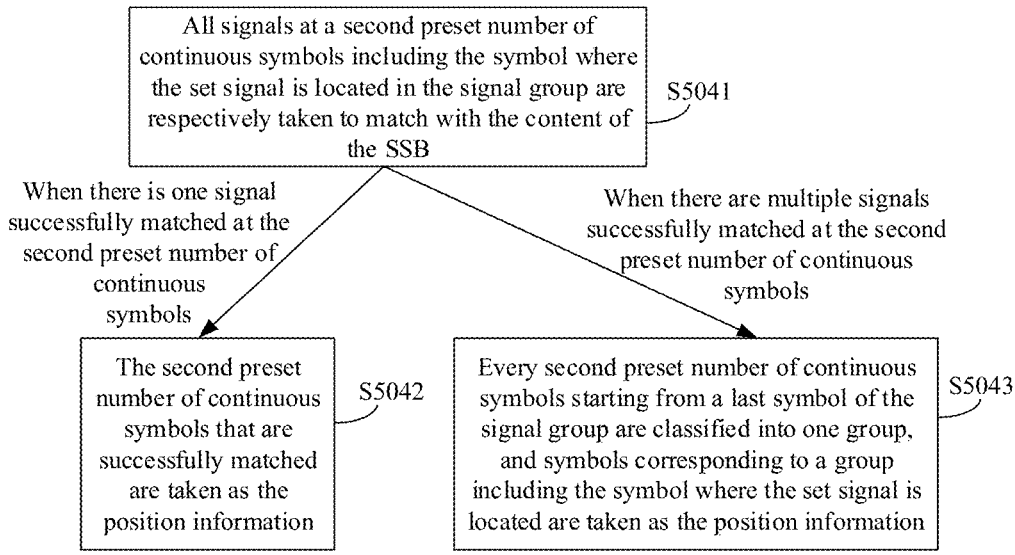
FIG. 9 illustrates a flowchart of determining position information of an SSB according to an exemplary embodiment of the present disclosure.

In the embodiment, upon the determination of the signal group, the position information of the SSB may be determined. As shown in FIG. 9, the operation that the position information of the SSB is determined may include the following operations.

In operation S5041, all signals at a second preset number of continuous symbols including the symbol where the set signal is located in the signal group are respectively taken to match with the content of the SSB.

The second preset number may be 4. The content of the SSB may include the content of the SSB before the SSB is subjected to the cyclic shift and the content of the SSB after the SSB is subjected to the cyclic shift.

In operation S5042, when there is one signal successfully matched at the second preset number of continuous symbols, the second preset number of continuous symbols that are successfully matched are taken as the position information.

In operation S5043, when there are multiple signals successfully matched at the second preset number of continuous symbols, every second preset number of continuous symbols from a last symbol of the signal group are taken as one group, and symbols corresponding to a group including the symbol where the set signal is located are taken as the position information.

Figure 7:
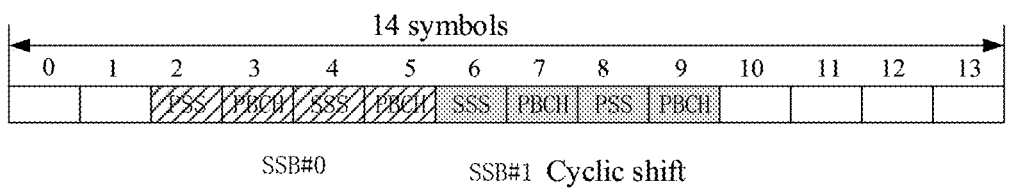
FIG. 7 illustrates a schematic diagram of positions of symbols where an SSB is located according to an exemplary embodiment of the present disclosure.

FIG. 7 is continuously used as an example for description. As the acquired signal group is the signal at the symbol #5 to the signal at the symbol #9, all signals at continuously four symbols including the symbol where the set signal is located in the signal group are taken to match with the content of the primary SSB or other SSB to obtain two signals that are successfully matched at the continuously four symbols. Starting from the last symbol of the signal group, that is, the symbol #9, every continuous four symbols serve as one group, that is, the symbol #9 to the symbol #6 serving as a first group. The first group includes the symbol #8, therefore, symbols corresponding to the first group, that is, the symbol #9 to the symbol #6, may serve as the position information of the SSB.

FIG. 8 is continuously used as an example for description. As the acquired signal group is the signal at the symbol #3 to the signal at the symbol #13, all signals at continuously four symbols including the symbol where the set signal is located in the signal group (that is, the symbol #6) are taken to match with the content of the primary SSB or other SSB to obtain multiple signals that are successfully matched at the continuously four symbols. Starting from the last symbol of the signal group, that is, the symbol #13, every continuous four symbols may serve as one group, that is, the symbol #13 to the symbol #10 serving as a first group, and the symbol #9 to the symbol #6 serving as a second group. The second group includes the symbol #6, therefore, symbols corresponding to the second group, that is, the symbol #9 to the symbol #6, may serve as the position information of the SSB.

In the embodiment, all of the second preset number of continuous symbols including the symbol where the set signal is located in the signal group may be respectively taken to match with the content of the SSB. When there is one symbol successfully matched at the second preset number of continuous symbols, the successfully matched second preset number of continuous symbols are taken as the position information. When there are multiple symbols successfully matched at the second preset number of continuous symbols, every second preset number of continuous symbols starting from a last symbol of the signal group are taken as one group, and symbols corresponding to the group including the symbol where the set signal is located are taken as the position information. Such implementation manner is simple, and the determined position information has a high accuracy.

In operation S505, an index of the SSB is determined based on the position information.

In the embodiment, an SSB may be received from a base station, a set signal configured to determine an SSB index may be detected in the SSB to obtain a position where the set signal is located, a signal group in the preset time window may be acquired based on the position where the set signal is located, position information of the SSB may be determined based on the signal group, and then an index of the SSB may be determined based on the determined position information. Accordingly, the determined index of the SSB can have a high accuracy.

Figure 10:
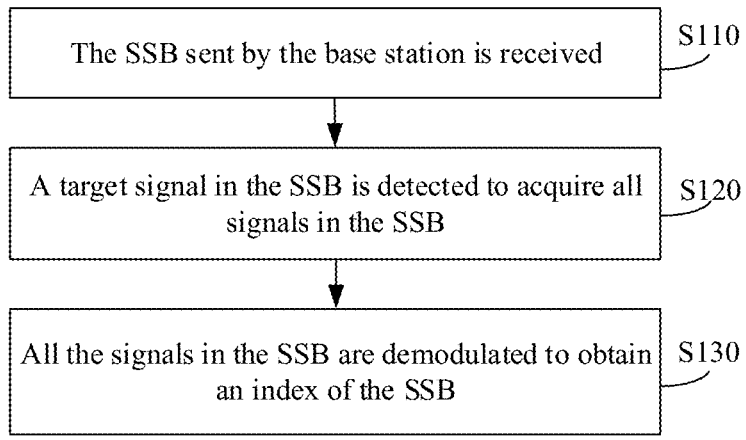
FIG. 10 illustrates another flowchart of receiving and detecting an SSB from a base station according to an exemplary embodiment of the present disclosure.

As shown in FIG. 10, the operation that the SSB sent by the base station is received and detected may include the following operations.

In operation S110, the SSB sent by the base station is received.

In operation S120, a target signal in the SSB is detected to acquire all signals in the SSB.

The target signal may be but not limited to a PSS.

In the embodiment, the target signal in the SSB may be detected to acquire the position where the target signal is located, and all the signals in the SSB may be acquired based on the position where the target signal is located.

For example, upon the detection of the PSS, supposing that a symbol where the PSS is located is n, the UE may backwardly find a symbol (n+1), a symbol (n+2) and a symbol (n+3).

In operation S130, all the signals in the SSB are demodulated to obtain an index of the SSB.

Upon finding the symbol (n+1), symbol (n+2) and symbol (n+3), the PSS, PBCH, SSS and PBCH may be acquired from the four symbols and subjected to signal demodulation to obtain an SSB index and an offset.

In addition, after the SSB index and the offset are obtained, the symbol where each signal in the SSB is located may be determined to realize time-domain synchronization with the base station.

In the embodiment, the implementation manner can be simple by detecting the target signal in the SSB to acquire all signals in the SSB and demodulating all the signals in the SSB to obtain the index of the SSB.

In operation S402, a primary SSB in an SSB group corresponding to the detected SSB is determined.

In the embodiment, the SSB group corresponding to the detected SSB may be determined according to a grouping rule, and the primary SSB in the SSB group may be determined according to a primary SSB selecting rule. It is to be noted that the UE does not expect to receive and detect more than one SSB in one SSB group, that is, the UE can at most receive and detect one SSB in one SSB group.

Optionally, before operation S402 is executed, the method may further include that: the grouping rule and the primary SSB selecting rule are defaulted, or the grouping rule and the primary SSB selecting rule may also be received from the base station.

Supposing that the SSB received and detected by the base station is SSB #1, it may be determined according to the grouping rule that the SSB #1 belongs to the first SSB group, and then it may be determined according to the primary SSB selecting rule that the primary SSB in the first SSB group is SSB #0.

In operation S403, indication information sent by the base station is received, and an SSB to be sent by the base station is determined based on the indication information.

When the received indication information indicates SSB #0 and SSB #4, the UE may know based on the indication information that SSBs to be sent by the base station are the SSB #0 and the SSB #4.

In operation S404, the number of SSBs corresponding to preambles in each RO and the number of ROs under FDM are received from the base station, and corresponding RO and preamble of the primary SSB are determined based on the SSB to be sent by the base station, a position of the primary SSB in the SSB to be sent by the base station, the number of SSBs corresponding to the preambles in each RO and the number of ROs under the FDM.

Supposing that the SSBs to be sent by the base station are the SSB #0 and the SSB #4, it may be determined that the primary SSB in the SSB group corresponding to the detected SSB is the SSB #0, all ROs corresponding to the SSBs to be sent are RO1-RO4, and the number of SSBs corresponding to the preambles in one RO is ½ (that is, one SSB corresponds to all preambles in two continuous ROs); and as SSB #0 is located prior to SSB #4, it may be determined that ROs corresponding to the SSB #0 are RO1-RO2, and corresponding preambles are all preambles in RO1-RO2.

In operation S405, the corresponding preamble is sent to the base station on the determined RO to realize RA to the base station.

In the embodiment, an SSB sent by the base station may be received and detected, a primary SSB in an SSB group corresponding to the detected SSB may be determined, indication information sent by a base station may be received and an SSB to be sent by the base station may be determined based on the indication information. Then, the number of SSBs corresponding to preambles in each RO that and the number of ROs under the FDM may be received from the base station, corresponding RO and preamble of the primary SSB may be determined based on the SSB to be sent by the base station, the position of the primary SSB in the SSB to be sent by the base station, the number of SSBs corresponding to the preambles in each RO and the number of ROs under the FDM, and the UE may send the corresponding preamble to the base station on the determined RO to realize the RA to the base station. That is, no matter which SSB is sent by the base station in one SSB group, the UE can perform RA on RO resources corresponding to the primary SSB of the SSB group, such that the SSB in the same SSB group can share the RO resources to increase the number of RO resources corresponding to each SSB, thereby improving the utilization rate of RO resources and improving the success rate of the RA of the UE.

Figure 11:
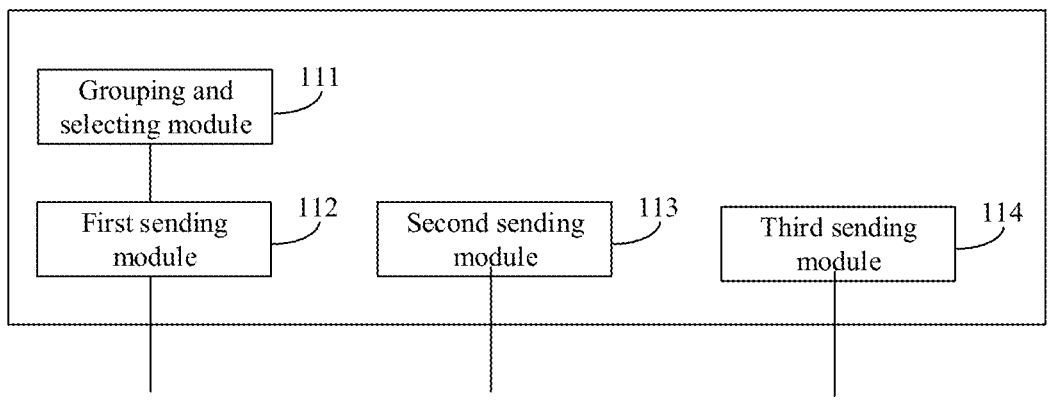
FIG. 11 illustrates a block diagram of an RA configuration apparatus according to an exemplary embodiment.

FIG. 11 illustrates a block diagram of an RA configuration apparatus according to an exemplary embodiment. The apparatus may be located in a base station. As shown in FIG. 11, the apparatus may include: a grouping and selecting module 111, a first sending module 112, a second sending module 113 and a third sending module 114.

The grouping and selecting module 111 is configured to group multiple SSBs and select a primary SSB from each SSB group.

The first sending module 112 is configured to send indication information to UE, the indication information indicating a primary SSB selected by the grouping and selecting module 111 in an SSB group to be sent.

The second sending module 113 is configured to send at most one SSB in each SSB group to be sent to the UE.

The third sending module 114 is configured to send the number of SSBs corresponding to preambles in each RO and the number of ROs under FDM to the UE.

In the embodiment, by grouping the multiple SSBs and sending at most one SSB in each SSB group to be sent to the UE, each SSB in the SSB groups can correspond to an RO resource, that is, the number of RO resources corresponding to each SSB is increased, and thus the utilization rate of RO resources is improved, and the success rate of RA of the UE is improved.

Figure 12:
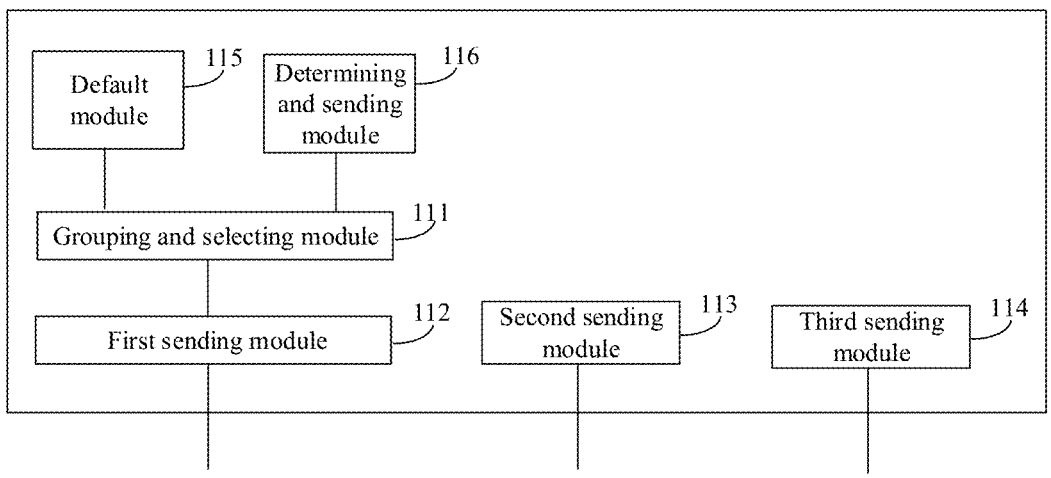
FIG. 12 illustrates a block diagram of another RA configuration apparatus according to an exemplary embodiment.

FIG. 12 illustrates a block diagram of another RA configuration apparatus according to an exemplary embodiment. As shown in FIG. 12, on the basis of the embodiment shown in FIG. 11, the apparatus may further include: a default module 115 or a determining and sending module 116.

The default module 115 is configured to, before the grouping and selecting module 111 groups the multiple SSBs and selects the primary SSB from each SSB group, default a grouping rule and a primary SSB selecting rule.

The determining and sending module 116 is configured to, before the grouping and selecting module 111 groups the multiple SSBs and selects the primary SSB from each SSB group, determine the grouping rule and the primary SSB selecting rule and send the grouping rule and the primary SSB selecting rule to the UE.

The grouping rule may include but not limited to at least one of: the number of beams, the number of the multiple SSBs, time-domain position distribution information of the multiple SSBs, a window size or a channel condition.

For example, the grouping may be performed based on the number of beams, or the grouping may be performed based on the number of multiple SSBs planned by the base station for transmission (that is, to be sent by the base station). Four continuous SSBs may be classified into one group or two continuous SSBs may be classified into one group based on the time-domain position distribution information of the multiple SSBs, or SSBs in a 1-ms window may be classified into one group, or more SSBs may be classified into one group when the SSBs have worse channel conditions. In this way, the occasion that one SSB in each group is sent may be increased and thus a waste of RO resources can be reduced.

The primary SSB selecting rule may include but not limited to that an SSB in each group is defaulted as the primary SSB. For example, a first SSB in each group may be defaulted as the primary SSB, or a last SSB in each group may be defaulted as the primary SSB.

In the embodiment, multiple SSBs may be grouped and one primary SSB may be selected from each SSB group by using a default grouping rule as the grouping rule and a default SSB selecting rule as the primary SSB selecting rule. Alternatively or additionally, the base station may determine the grouping rule and the primary SSB selecting rule adaptively and send the grouping rule and the primary SSB selecting rule to the UE.

Figure 13:
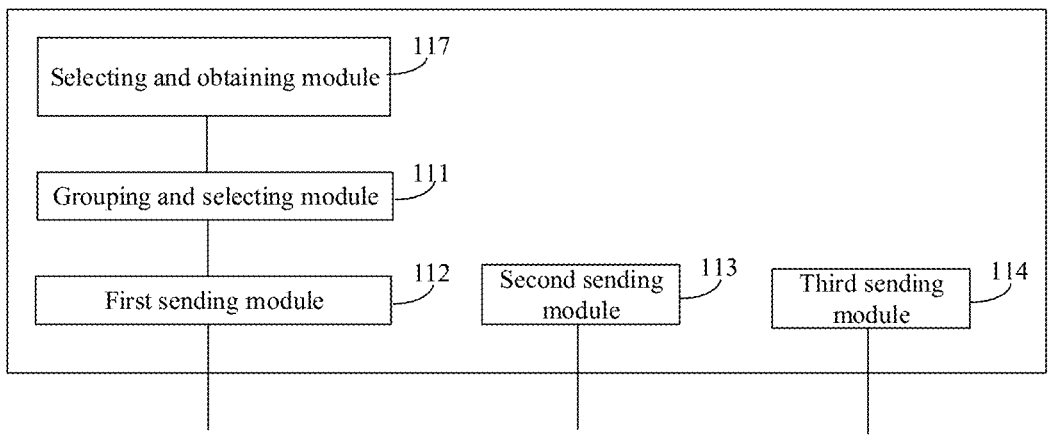
FIG. 13 illustrates a block diagram of another RA configuration apparatus according to an exemplary embodiment of the present disclosure.

FIG. 13 illustrates a block diagram of another RA configuration apparatus according to an exemplary embodiment. As shown in FIG. 13, on the basis of the embodiment shown in FIG. 11, the apparatus may further include: a selecting and obtaining module 117.

The selecting and obtaining module 117 is configured to, before the grouping and selecting module 111 groups the multiple SSBs, select at least one SSB from the multiple SSBs as a target SSB and obtain multiple sendable positions for each target SSB.

The multiple sendable positions for each target SSB may be obtained in the following two manners.

Manner 1) is cyclic shift: based on a position where a set signal configured to determine an index of each target SSB is located, cyclic shift that is of a symbol level is performed on other signals than the set signal in each target SSB to obtain the multiple sendable positions for each target SSB, wherein the set signal has a same position in the multiple sendable positions with a position in the target SSB.

The set signal may include but not limited to a PSS, an SSS or a PBCH located in the SSB.

For instance, the SSB #0 shown in FIG. 2 is used as an example to describe a process for obtaining multiple sendable positions for the SSB #0. The positions of the SSB #0 shown in FIG. 2 are initial sendable positions for the SSB #0.

When the set signal is the PSS, based on the position where the set signal is located, that is, the symbol 2, the cyclic shift that is of the symbol level may be performed on other signals than the set signal in the primary SSB to obtain the multiple sendable positions for the SSB as below:

position 11) corresponding to symbols 0-3, signals sent by the symbols 0-3 respectively being: SSS, PBCH, PSS and PBCH;

position 12) corresponding to symbols 1-4, signals sent by the symbols 1-4 respectively being: PBCH, PSS, PBCH and SSS;

position 13) corresponding to symbols 2-5, the symbols 2-5 being initial sendable positions for the SSB #0 and the transmitted signals respectively being: PSS, PBCH, SSS and PBCH.

It is to be noted that as the SSB #0 is used as an example herein and the SSB cannot be sent before a 5-ms window, the case where the PSS is at the last cannot be obtained after the SSB #0 takes the PSS as the set signal to subject to the cyclic shift, and the case where the PSS is at the last is available to the SSB at other positions.

For example, when the set signal PSS in the SSB #1 is the PSS, there may be another position that is symbols 5-8. Signals sent by the symbols 5-8 respectively are: PBCH, SSS, PBCH and PSS, that is, the PSS is the last symbol in the four symbols.

As can be seen from the obtained multiple sendable positions, the position where the PSS is located in the multiple sendable positions is the same and always located at the position of the symbol 2. As the SSB indexes corresponding to the multiple sendable positions are determined by a position of a symbol where the PSS is located, the SSB indexes corresponding to the multiple sendable positions are the same.

When the set signal is the SSS, based on the position where the set signal is located, that is, the symbol 4, the cyclic shift that is of the symbol level may be performed on other signals than the set signal in SSB #0 to obtain the multiple sendable positions for the SSB:

position 21) corresponding to symbols 1-4, signals sent by the symbols 1-4 respectively being: PBCH, PSS, PBCH and SSS;

position 22) corresponding to symbols 2-5, signals sent by the symbols 2-5 respectively being: PSS, PBCH, SSS and PBCH;

position 23) corresponding to symbols 3-6, signals sent by the symbols 3-6 respectively being: PBCH, SSS, PBCH and PSS; and position 24) corresponding to symbols 4-7, signals sent by the symbols 4-7 respectively being: SSS, PBCH, PSS and PBCH.

As can be seen from the obtained multiple sendable positions, the position where the SSS is located in the multiple sendable positions is the same and always located at the position of the symbol 4. As the SSB indexes at the multiple sendable positions are determined by a position of a symbol where the SSS is located, the SSB indexes corresponding to the multiple sendable positions are the same.

In this case, each target SSB and multiple SSBs corresponding to the multiple sendable positions obtained after the cyclic shift may be classified into one group.

Manner 2) is overall shifting: signals in each target SSB are overall shifted based on a position of each target SSB to obtain the multiple sendable positions for each target SSB.

Optionally, a corresponding offset may be determined based on an overall offset between each sendable position and an initial sendable position.

In order to clearly describe the processes for obtaining the multiple sendable positions and determining the offset, the SSB #0 shown in FIG. 2 is still used as an example below for description. By overall shifting signals in the SSB #0 shown in FIG. 2, the following multiple sendable positions may be obtained:

position 31) corresponding to symbols 0-3, signals sent by the symbols 0-3 respectively being: PSS, PBCH, SSS and PBCH, and the position being deviated forward by two symbols relative to the initial sendable position, that is, the offset being −2.

position 32) corresponding to symbols 1-4, signals sent by the symbols 1-4 respectively being: PSS, PBCH, SSS and PBCH, and the position being deviated forward by one symbol relative to the initial sendable position, that is, the offset being −1;

position 33) corresponding to symbols 2-5 being initial sendable positions, and the offset being 0;

position 34) corresponding to symbols 3-6, signals sent by the symbols 3-6 respectively being: PSS, PBCH, SSS and PBCH, and the position being deviated backward by one symbol relative to the initial sendable position, that is, the offset being 1; and position 35) corresponding to symbols 4-7, signals sent by the symbols 4-7 respectively being: PSS, PBCH, SSS and PBCH, and the position being deviated backward by two symbols relative to the initial sendable position, that is, the offset being 2.

Therefore, the multiple sendable positions may be obtained in the above manner. However, the more the sendable positions, the greater the offset, and the greater the number of bits for indicating the offset. In the embodiment, the offset may be limited, for example, only deviating backward by M symbols, or only deviating forward by N symbols, or the like, wherein both the M and the N are an integer value greater than or equal to 0 and smaller than or equal to an X, and the X may be set as required and may be smaller than or equal to 8 for example. In the embodiment, by limiting the offset, the number of bits increased due to signaling of the base station for indicating the offset can be as less as possible, thereby saving the signaling overhead of PBCH.

In this case, each target SSB and multiple SSBs corresponding to the multiple sendable positions obtained after each target SSB being subjected to the overall shifting may be classified into one group.

In the embodiment, multiple SSBs can be subsequently grouped by selecting at least one SSB from the multiple SSBs as the target SSB and obtaining multiple sendable positions for each target SSB.

Figure 14:
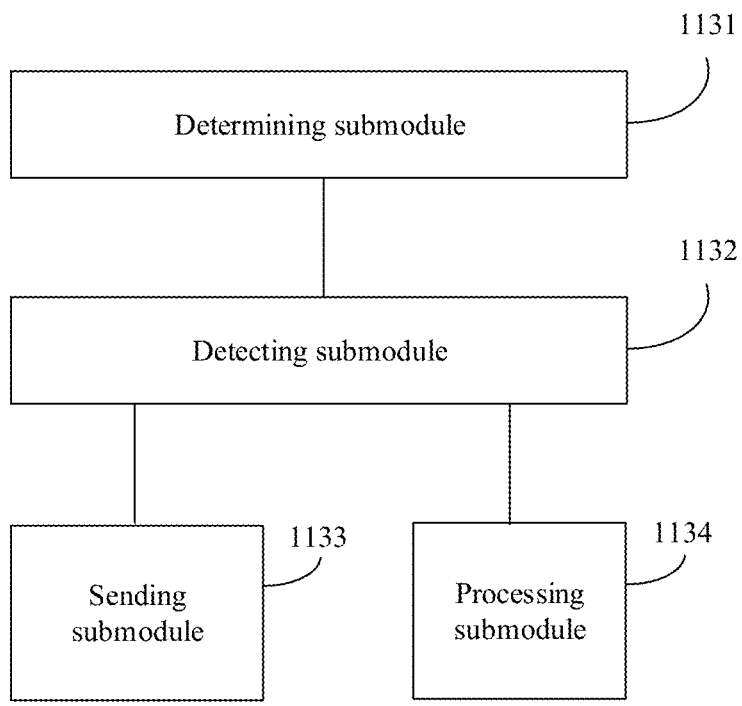
FIG. 14 illustrates a block diagram of another RA configuration apparatus according to an exemplary embodiment of the present disclosure.

FIG. 14 illustrates a block diagram of another RA configuration apparatus according to an exemplary embodiment. As shown in FIG. 14, on the basis of the embodiment shown in FIG. 11, the second sending module 113 may include: a determining submodule 1131, a detecting submodule 1132, a sending submodule 1133 and a processing submodule 1134.

The determining submodule 1131 is configured to take a first SSB in each SSB group to be sent as a present SSB.

The detecting submodule 1132 is configured to perform channel detection prior to a sending position for the present SSB determined by the determining submodule 1131.

The sending submodule 1133 is configured to send the present SSB in responses to the detecting submodule 1132 detecting that a channel is idle.

The processing submodule 1134 is configured to take an SSB next to the present SSB as the present SSB in response to the detecting submodule 1132 detecting that the channel is busy, and continuously call the detecting submodule 1132 to perform the channel detection prior to the sending position for the present SSB till one SSB is successfully sent or channels prior to sending positions for all SSBs in a corresponding SSB group to be sent are all busy.

In the embodiment, waste of RO resources can be subsequently decreased by sending at most one SSB in each SSB group to be sent to the UE.

Figure 15:
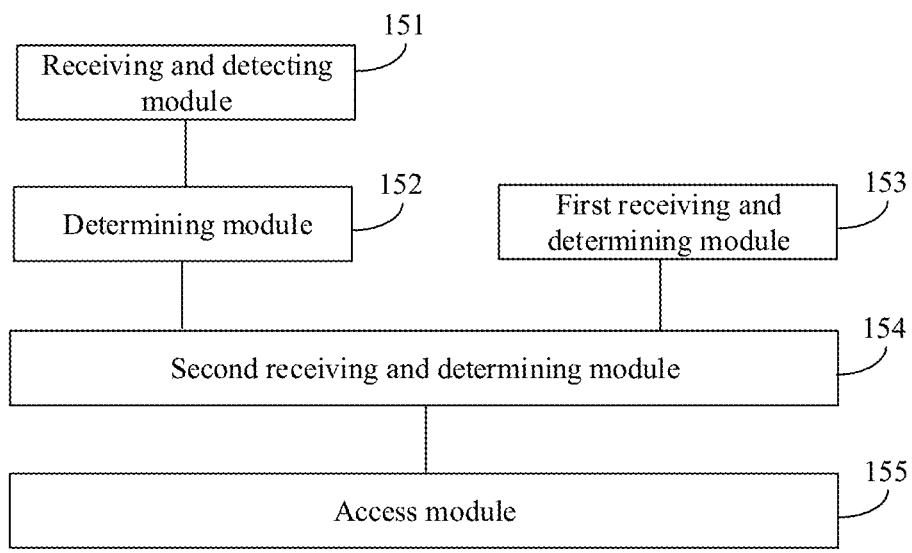
FIG. 15 illustrates a block diagram of an RA apparatus according to an exemplary embodiment.

FIG. 15 illustrates a block diagram of another RA apparatus according to an exemplary embodiment. The apparatus may be located in UE. As shown in FIG. 15, the apparatus may include: a receiving and detecting module 151, a determining module 152, a first receiving and determining module 153, a second receiving and determining module 154 and an access module 155.

The receiving and detecting module 151 is configured to receive and detect an SSB from a base station.

The determining module 152 is configured to determine a primary SSB in an SSB group corresponding to the SSB detected by the receiving and detecting module.

It is to be noted that the UE does not expect to receive and detect more than one SSB in one SSB group, that is, the UE can at most receive and detect one SSB in one SSB group.

The first receiving and determining module 153 is configured to receive indication information from the base station, and determine, based on the indication information, an SSB to be sent by the base station.

The second receiving and determining module 154 is configured to receive the number of SSBs corresponding to preambles in each RO and the number of ROs under FDM from the base station, and determine corresponding RO and preamble of the primary SSB based on the SSB determined by the first receiving and determining module 153 and to be sent by the base station, a position of the primary SSB determined by the determining module 152 in the SSB to be sent by the base station, the number of SSBs corresponding to the preambles in each RO and the number of ROs under the FDM.

Supposing that the SSBs to be sent by the base station is the SSB #0 and the SSB #4, it may be determined that the primary SSB in the SSB group corresponding to the detected SSB is the SSB #0, all ROs corresponding to the SSBs to be sent are RO1-RO4, and the number of SSBs corresponding to the preambles in one RO is ½ (that is, one SSB corresponds to all preambles in two continuous ROs); and as SSB #0 is located prior to SSB #4, it may be determined that ROs corresponding to the SSB #0 are RO1-RO2, and corresponding preambles are all preambles in RO1-RO2.

The access module 155 is configured to send the corresponding preamble to the base station on the RO determined by the second receiving and determining module 154 to realize RA to the base station.

In the embodiment, an SSB sent by a base station may be received and detected, a primary SSB in an SSB group corresponding to the detected SSB may be determined, indication information sent by the base station may be received and an SSB to be sent by the base station may be determined based on the indication information. Then, the number of SSBs corresponding to preambles in each RO and the number of ROs under the FDM may be received from the base station, corresponding RO and preamble of the primary SSB may be determined based on the SSB to be sent by the base station, the position of the primary SSB in the SSB to be sent by the base station, the number of SSBs corresponding to the preambles in each RO and the number of ROs under the FDM, and the UE may send the corresponding preamble to the base station on the determined RO to realize the RA to the base station. That is, no matter which SSB is sent by the base station in one SSB group, the UE can perform RA on RO resources corresponding to the primary SSB of the SSB group, such that the SSB in the same SSB group can share the RO resources to increase the number of RO resources corresponding to each SSB, thereby improving the utilization rate of RO resources and improving the success rate of the RA of the UE.

Figure 16:
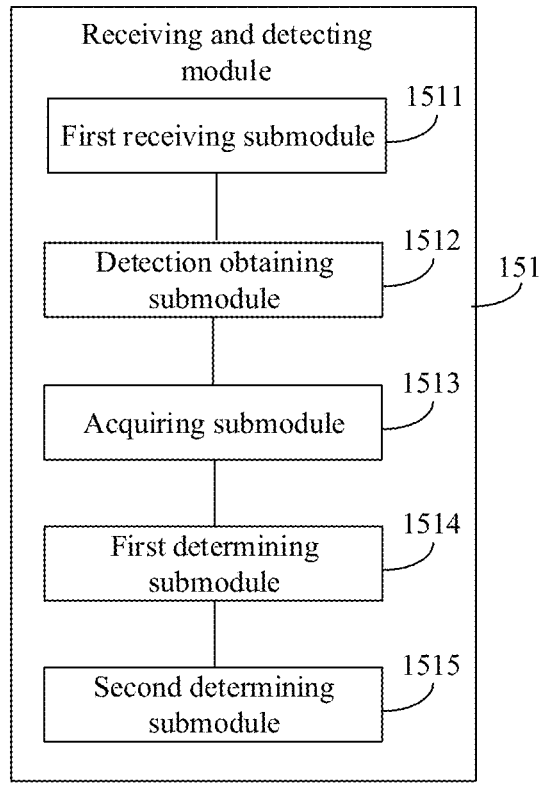
FIG. 16 illustrates a block diagram of another RA apparatus according to an exemplary embodiment.

FIG. 16 illustrates a block diagram of another RA apparatus according to an exemplary embodiment. As shown in FIG. 16, on the basis of the embodiment shown in FIG. 15, the receiving and detecting module 151 may include: a first receiving submodule 1511, a detection obtaining submodule 1512, an acquiring submodule 1513, a first determining submodule 1514 and a second determining submodule 1515.

The first receiving submodule 1511 is configured to receive the SSB from the base station.

The detection obtaining submodule 1512 is configured to detect a set signal configured to determine an SSB index in the SSB received by the first receiving submodule 1511 to obtain a position where the set signal is located.

The set signal may be determined in a variety of manners. For example, the signal in the SSB may be determined as the set signal, that is, the set signal in any case is the same; or a different signal in the SSB may also be determined as the set signal based on a sending frequency or sub-carrier interval of the SSB.

The acquiring submodule 1513 is configured to acquire a signal group in a preset time window based on the position where the set signal is located and that is obtained by the detection obtaining submodule 1512.

The first determining submodule 1514 is configured to determine position information of the SSB based on the signal group acquired by the acquiring submodule 1513.

The second determining submodule 1515 is configured to determine an index of the SSB based on the position information determined by the first determining submodule 1514.

In the embodiment, an SSB may be received from a base station, a set signal configured to determine an SSB index may be detected in the SSB to obtain a position where the set signal is located, a signal group in the preset time window may be acquired based on the position where the set signal is located, position information of the SSB may be determined based on the signal group, and then an index of the SSB may be determined based on the determined position information. Accordingly, the determined index of the SSB can have a high accuracy.

Figure 17:
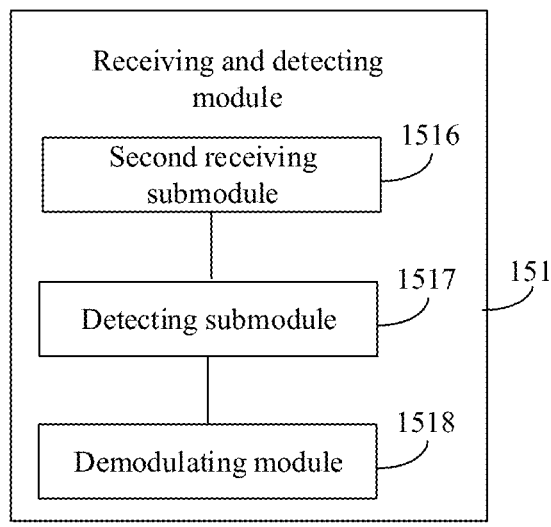
FIG. 17 illustrates a block diagram of another RA apparatus according to an exemplary embodiment.

FIG. 17 illustrates a block diagram of another RA apparatus according to an exemplary embodiment. As shown in FIG. 17, on the basis of the embodiment shown in FIG. 15, the receiving and detecting module 151 may include: a second receiving submodule 1516, a detecting submodule 1517, and a demodulating module 1518.

The second receiving submodule 1516 is configured to receive the SSB from the base station.

The detecting submodule 1517 is configured to detect a target signal in the SSB received by the second receiving submodule 1516 to acquire all signals in the SSB.

The target signal may be but not limited to a PSS.

In the embodiment, the target signal in the SSB may be detected to acquire the position where the target signal is located, and all the signals in the SSB may be acquired based on the position where the target signal is located.

For example, upon the detection of the PSS, supposing that a symbol where the PSS is located is n, the UE may backwardly find a symbol (n+1), a symbol (n+2) and a symbol (n+3).

The demodulating module 1518 is configured to demodulate all the signals acquired by the detecting submodule 1517 in the SSB to obtain an index of the SSB.

Upon finding the symbol (n+1), symbol (n+2) and symbol (n+3), the PSS, PBCH, SSS and PBCH may be acquired from the four symbols and subjected to signal demodulation to obtain an SSB index and an offset.

In addition, after the SSB index and the offset are obtained, the symbol where each signal in the SSB is located may be determined to realize time-domain synchronization with the base station.

In the embodiment, the implementation manner can be simple by detecting the target signal in the SSB to acquire all signals in the SSB and demodulating all the signals in the SSB to obtain the index of the SSB.

Figure 18:
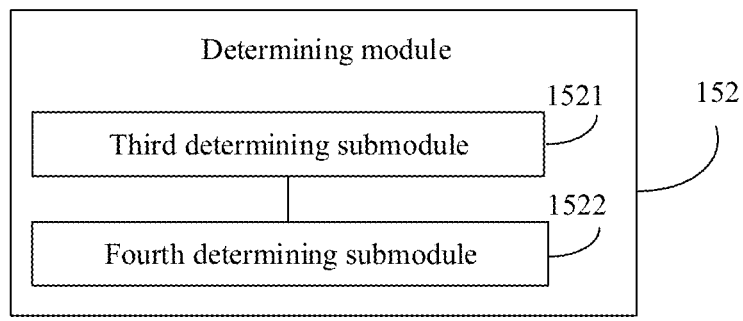
FIG. 18 illustrates a block diagram of another RA apparatus according to an exemplary embodiment.

FIG. 18 illustrates a block diagram of another RA apparatus according to an exemplary embodiment. As shown in FIG. 18, on the basis of the embodiment shown in FIG. 15, the determining module 152 may include: a third determining submodule 1521 and a fourth determining submodule 1522.

The third determining submodule 1521 is configured to determine, based on a grouping rule, the SSB group corresponding to the detected SSB.

The fourth determining submodule 1522 is configured to determine, based on a primary SSB selecting rule, a primary SSB in the SSB group determined by the third determining submodule 1521.

In the embodiment, the SSB group corresponding to the detected SSB may be determined according to a grouping rule, and the primary SSB in the SSB group may be determined according to a primary SSB selecting rule.

In the embodiment, the SSB group corresponding to the detected SSB may be determined according to the grouping rule, and the primary SSB in the SSB group may be determined according to the primary SSB selecting rule, such that RO resources corresponding to the primary SSB can be subsequently determined.

Figure 19:
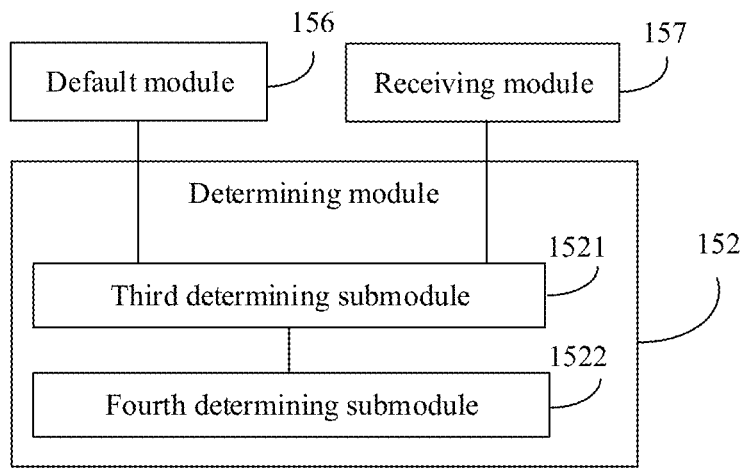
FIG. 19 illustrates a block diagram of another RA apparatus according to an exemplary embodiment.

FIG. 19 illustrates a block diagram of another RA apparatus according to an exemplary embodiment. As shown in FIG. 19, on the basis of the embodiment shown in FIG. 18, the apparatus may further include: a default module 156 or a receiving module 157.

The default module 156 is configured to default the grouping rule and the primary SSB selecting rule.

The receiving module 157 is configured to receive the grouping rule and the primary SSB selecting rule from the base station.

In the embodiment, the primary SSB in the SSB group corresponding to the detected SSB can be subsequently determined by defaulting the grouping rule and the primary SSB selecting rule or receiving the grouping rule and the primary SSB selecting rule from the base station.

Figure 20:
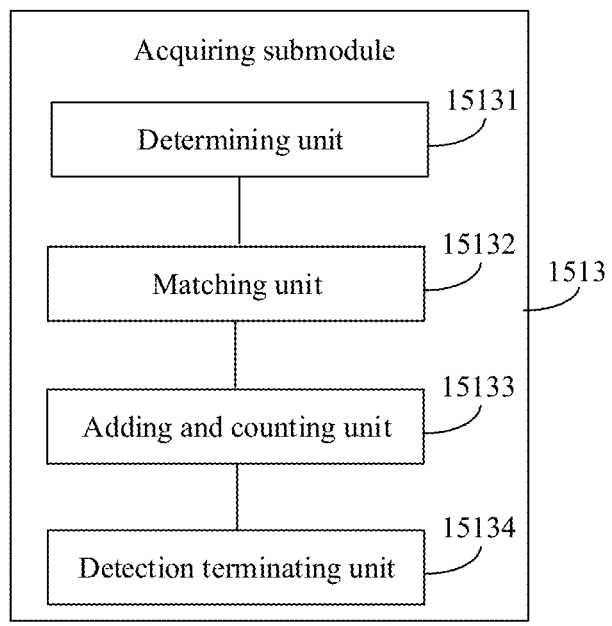
FIG. 20 illustrates a block diagram of another RA apparatus according to an exemplary embodiment.

FIG. 20 illustrates a block diagram of another RA apparatus according to an exemplary embodiment. As shown in FIG. 20, on the basis of the embodiment shown in FIG. 16, the acquiring submodule 1513 may include: a determining unit 15131, a matching unit 15132, an adding and counting unit 15133, and a detection terminating unit 15134.

The determining unit 15131 is configured to determine a symbol prior to or after a symbol where the set signal is located as a present symbol.

The matching unit 15132 is configured to determine whether the set signal and a signal on the present symbol determined by the determining unit 15131 are matched with a content of the SSB, wherein the content of the SSB includes a content of the SSB before the SSB is subjected to cyclic shift and a content of the SSB after the SSB is subjected to the cyclic shift.

The adding and counting unit 15133 is configured to, when a result from the matching unit 15132 is matching, add the signal on the present symbol to the signal group, count a total number of present symbols, and, when the total number does not reach a first preset number, correspondingly take the present symbol and a symbol prior to the present symbol or take the present signal and a symbol after the present symbol as the present symbols, and repeatedly call the matching unit 15132 to execute the operation of determining whether signals on the present symbols and the set signal are matched with the content of the SSB till the total number reaches the first preset number.

The detection terminating unit 15134 is configured to, when the matching result of the matching unit 15132 is mismatching, terminate detection of a symbol prior to a symbol presently added to the signal group or a symbol after a symbol presently added to the signal group.

The operation that the signal group in the preset time window is acquired based on the position where the set signal is located may include that: a first signal group in a first preset time window and a second signal group in a second preset time window are acquired based on the position where the set signal is located.

The first preset time window is located prior to the position where the set signal is located, and the second preset time window is located after the position where the set signal is located. The first signal group, the second signal group and the set signal form the above signal group.

In the embodiment, whether the signal on the present symbol and the set signal are matched with the content of the SSB may be determined, and when matched, the present symbol may be added to the signal group and the above operation is repeated till the number of present symbols reaches the first preset number; otherwise, when not matched, the detection of the symbol prior to or after the symbol presently added to the signal group is terminated, thereby acquiring the signal group.

Figure 21:
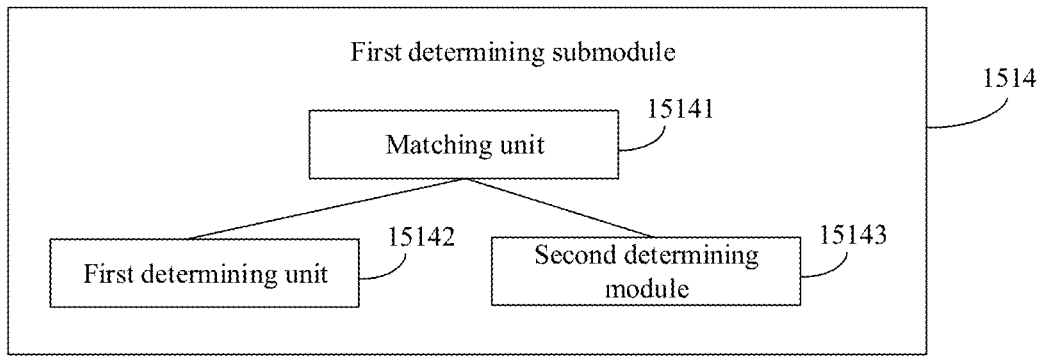
FIG. 21 illustrates a block diagram of another RA apparatus according to an exemplary embodiment.

FIG. 21 illustrates a block diagram of another RA apparatus according to an exemplary embodiment. As shown in FIG. 21, on the basis of the embodiment shown in FIG. 16, the first determining submodule 1514 may include: a matching unit 15141, a first determining unit 15142, and a second determining module 15143.

The matching unit 15141 is configured to respectively match all signals at a second preset number of continuous symbols including the symbol where the set signal is located in the signal group with the content of the SSB, wherein the content of the SSB includes the content of the SSB before the SSB is subjected to the cyclic shift and the content of the SSB after the SSB is subjected to the cyclic shift.

The first determining unit 15142 is configured to, when there is one signal, successfully matched by the matching unit 15141 at the second preset number of continuous symbols, take the second preset number of continuous symbols that are successfully matched as the position information.

The first preset number may be 4.

The second determining module 15143 is configured to, when there are multiple signals, successfully matched by the matching unit 15141 at the second preset number of continuous symbols, take every second preset number of continuous symbols as one group from a last symbol of the signal group, and take symbols corresponding to a group including the symbol where the set signal is located as the position information.

FIG. 7 is continuously used as an example for description. As the acquired signal group is the signal at the symbol #5 to the signal at the symbol #9, all signals at continuously four symbols including the symbol where the set signal is located in the signal group are taken to match with the content of the primary SSB or other SSB to obtain two signals that are successfully matched at the continuously four symbols. Starting from the last symbol of the signal group, that is, the symbol #9, every continuous four symbols serve as one group, that is, the symbol #9 to the symbol #6 serving as a first group. The first group includes the symbol #8, therefore, symbols corresponding to the first group, that is, the symbol #9 to the symbol #6, may serve as the position information of the SSB.

FIG. 8 is continuously used as an example for description. As the acquired signal group is the signal at the symbol #3 to the signal at the symbol #13, all signals at continuously four symbols including the symbol where the set signal is located in the signal group (that is, the symbol #6) are taken to match with the content of the primary SSB or other SSB to obtain multiple signals that are successfully matched at the continuously four symbols. Starting from the last symbol of the signal group, that is, the symbol #13, every continuous four symbols may serve as one group, that is, the symbol #13 to the symbol #10 serving as a first group, and the symbol #9 to the symbol #6 serving as a second group. The second group includes the symbol #6, therefore, symbols corresponding to the second group, that is, the symbol #9 to the symbol #6, may serve as the position information of the SSB.

In the embodiment, all of the second preset number of continuous symbols including the symbol where the set signal is located in the signal group may be respectively taken to match with the content of the SSB. When there is one symbol successfully matched at the second preset number of continuous symbols, the successfully matched second preset number of continuous symbols are taken as the position information. When there are multiple symbols successfully matched at the second preset number of continuous symbols, every second preset number of continuous symbols starting from a last symbol of the signal group are taken as one group, and symbols corresponding to the group including the symbol where the set signal is located are taken as the position information. Such implementation manner is simple, and the determined position information has a high accuracy.

Figure 22:
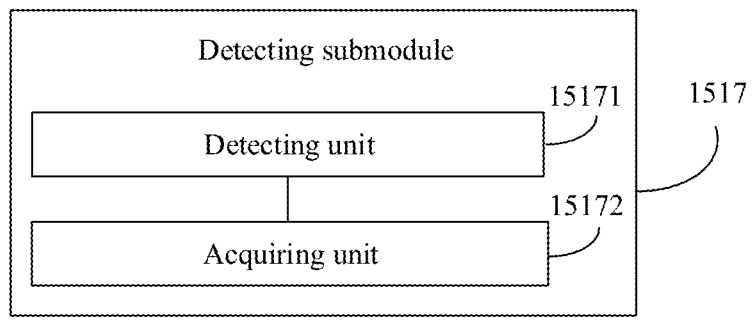
FIG. 22 illustrates a block diagram of another RA apparatus according to an exemplary embodiment.

FIG. 22 illustrates a block diagram of another RA apparatus according to an exemplary embodiment. As shown in FIG. 22, on the basis of the embodiment shown in FIG. 17, the detecting submodule 1517 may include: a detecting unit 15171 and an acquiring unit 15172.

The detecting unit 15171 is configured to detect the target signal in the SSB to obtain a position where the target signal is located.

The acquiring unit 15172 is configured to acquire all signals in the SSB based on the position where the target signal is located and that is obtained by the detecting unit 15171.

In the embodiment, the target signal in the SSB may be detected to acquire the position where the target signal is located, and all the signals in the SSB may be acquired based on the position where the target signal is located, such that an index of the SSB can be subsequently obtained.

Figure 23:
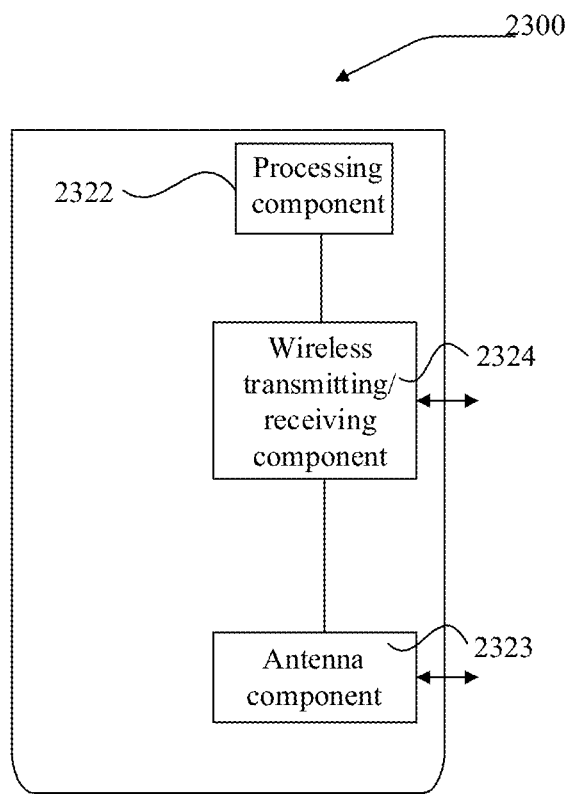
FIG. 23 illustrates a block diagram of an RA configuration apparatus according to an exemplary embodiment.

FIG. 23 illustrates a block diagram of an RA configuration apparatus according to an exemplary embodiment. The apparatus 2300 may be provided as a base station. Referring to FIG. 23, the apparatus 2300 includes a processing component 2322, a wireless transmitting/receiving component 2324, an antenna component 2326, and a signal processing portion special for a wireless interface. The processing component 2322 may further include one or more processors.

One processor in the processing component 2322 may be configured to:

group multiple SSBs, and select a primary SSB from each SSB group;

send indication information to UE, the indication information indicating a primary SSB in an SSB group to be sent;

send at most one SSB in each SSB group to be sent to the UE; and send the number of SSBs corresponding to preambles in each RO and the number of ROs under FDM to the UE.

In an exemplary embodiment, a non-temporary computer-readable storage medium including instructions is further provided. The instructions may be executed by the processing component 2322 of the apparatus 2300 to complete the above RA configuration method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Figure 24:
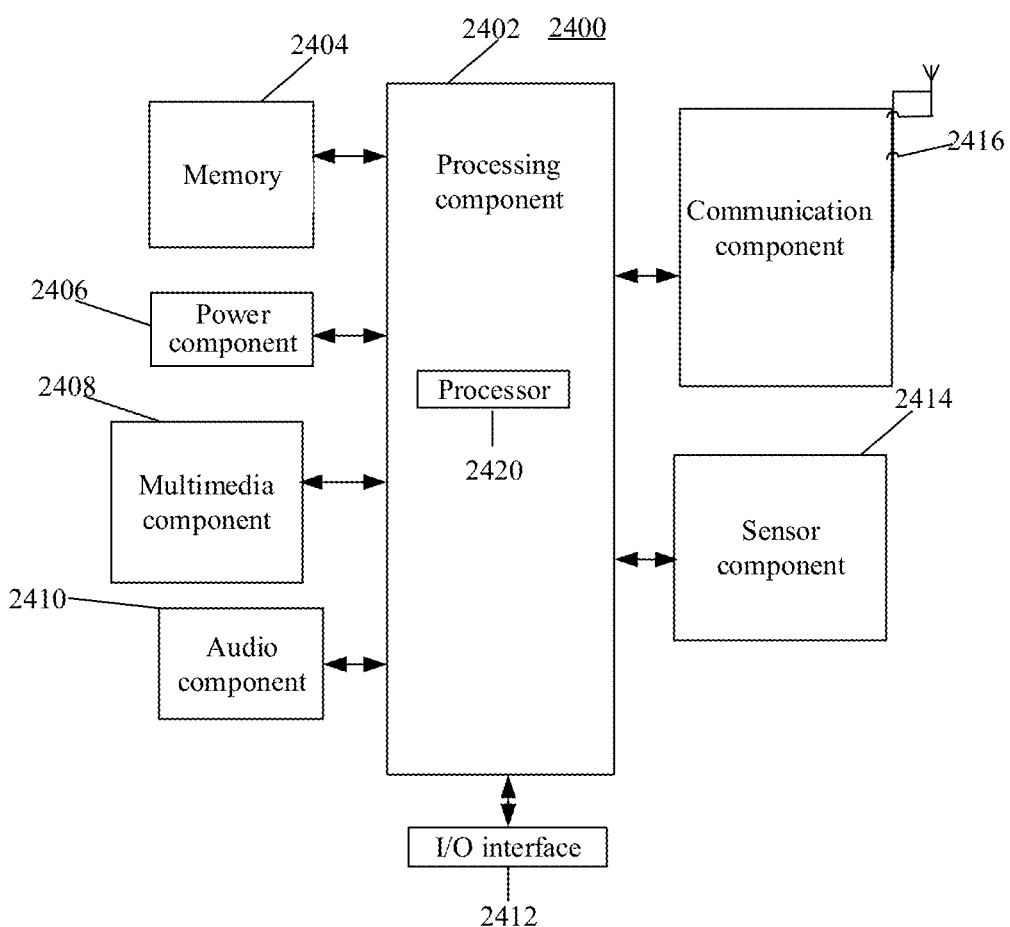
FIG. 24 illustrates a block diagram of an RA apparatus according to an exemplary embodiment.

FIG. 24 illustrates a block diagram of an RA apparatus according to an exemplary embodiment. For example, the apparatus 2400 may be a mobile phone, a computer, a digital broadcast terminal, a messaging device, a gaming console, a tablet, a medical device, exercise equipment, a Personal Digital Assistant (PDA), and the like.

Referring to FIG. 24, the apparatus 2400 may include at least one of the following components: a processing component 2402, a memory 2404, a power component 2406, a multimedia component 2408, an audio component 2410, an Input/Output (I/O) interface 2412, a sensor component 2414, or a communication component 2416.

The processing component 2402 typically controls overall operations of the apparatus 2400, such as the operations associated with display, telephone calls, data communications, camera operations, and recording operations. The processing component 2402 may include one or more processors 2420 to execute instructions to perform all or part of the operations in the above described methods. Moreover, the processing component 2402 may include one or more modules which facilitate the interaction between the processing component 2402 and other components. For instance, the processing component 2402 may include a multimedia module to facilitate the interaction between the multimedia component 2408 and the processing component 2402.

One processor 2420 in the processing component 2402 may be configured to:

receive and detect an SSB sent by a base station;

determine a primary SSB in an SSB group corresponding to the detected SSB;

receive indication information from the base station, and determine, based on the indication information, an SSB to be sent by the base station;

receive the number of SSBs corresponding to preambles in each RO and the number of ROs under FDM from the base station, and determine corresponding RO and preamble of the primary SSB based on the SSB to be sent by the base station, a position of the primary SSB in the SSB to be sent by the base station, the number of SSBs corresponding to the preambles in each RO and the number of ROs under the FDM; and send the corresponding preamble to the base station on the determined RO to realize RA to the base station.

The memory 2404 is configured to store various types of data to support the operation of the apparatus 2400. Examples of such data include instructions for any applications or methods operated on the apparatus 2400, contact data, phonebook data, messages, pictures, video, etc. The memory 2404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 2406 may provide power to various components of the apparatus 2400. The power component 2406 may include a power management system, at least one power sources, and any other components associated with the generation, management, and distribution of power in the apparatus 2400.

The multimedia component 2408 includes a screen providing an output interface between the apparatus 2400 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 2408 includes a front camera and/or a rear camera. The front camera and/or the rear camera may receive external multimedia data when the apparatus 2400 is in an operation mode, such as a photographing mode or a video mode. Each of the front camera and the rear camera may be a fixed optical lens system or have focus and optical zoom capability.

The audio component 2410 is configured to output and/or input audio signals. For example, the audio component 2410 includes a Microphone (MIC) configured to receive an external audio signal when the apparatus 2400 is in an operation mode, such as a call mode, a recording mode, and a voice recognition mode. The received audio signal may further be stored in the memory 2404 or transmitted via the communication component 2416. In some embodiments, the audio component 2410 further includes a speaker configured to output audio signals.

The I/O interface 2412 may provide an interface between the processing component 2402 and peripheral interface modules. The peripheral interface modules may be a keyboard, a click wheel, buttons, and the like. The buttons may include, but are not limited to, a home button, a volume button, a starting button, and a locking button.

The sensor component 2414 may include one or more sensors to provide status assessments of various aspects of the apparatus 2400. For instance, the sensor component 2414 may detect an on/off status of the apparatus 2400 and relative positioning of components, such as a display and small keyboard of the apparatus 2400, and the sensor component 2414 may further detect a change in a position of the apparatus 2400 or a component of the apparatus 2400, presence or absence of contact between the user and the apparatus 2400, orientation or acceleration/deceleration of the apparatus 2400 and a change in temperature of the apparatus 2400. The sensor component 2414 may include a proximity sensor, configured to detect the presence of nearby objects without any physical contact. The sensor component 2414 may also include a light sensor, such as a Complementary Metal Oxide Semiconductor (CMOS) or Charge Coupled Device (CCD) image sensor, configured for use in an imaging application. In some embodiments, the sensor component 2414 may also include an accelerometer sensor, a gyroscope sensor, a magnetic sensor, a pressure sensor, or a temperature sensor.

The communication component 2416 is configured to facilitate communication, wired or wirelessly, between the apparatus 2400 and other devices. The apparatus 2400 may access a communication-standard-based wireless network, such as a Wireless Fidelity (WiFi) network, a 2nd-Generation (2G) or 3rd-Generation (3G) network or a combination thereof. In an exemplary embodiment, the communication component 2416 receives a broadcast signal or broadcast associated information from an external broadcast management system via a broadcast channel. In an exemplary embodiment, the communication component 2416 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the apparatus 2400 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including instructions is further provided, for example, the memory 2404 including instructions. The instructions may be executed by the processing component 2420 of the apparatus 2400 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

The apparatus embodiments are basically corresponding to the method embodiments, so relevant part may refer to the description in the method embodiments. The above described apparatus embodiments are merely schematic. The units described as separate parts may or may not be physically separate, and parts displayed as units may or may not be physical units, which may be located in one position or may be distributed on a plurality of network units. Some or all of the units may be selected according to actual needs to achieve the objectives of the solutions of the embodiments. Those of ordinary skill in the art may understand and implement the present disclosure without creative work.

It is to be noted that the relational terms such as first and second may be used herein solely to distinguish one entity or action from another entity or action without necessarily requiring or implying any actual such relationship or order between such entities or actions. The terms "comprises", "comprising" or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

In an embodiment, the method may further include that:
before the multiple SSBs are grouped and the primary SSB is selected from each SSB group, a grouping rule and a primary SSB selecting rule are defaulted; or
a grouping rule and a primary SSB selecting rule are determined, and the grouping rule and the primary SSB selecting rule are sent to the UE.

In an embodiment, the method may further include that:
before the multiple SSBs are grouped, at least one SSB is selected from the multiple SSBs as a target SSB, and multiple sendable positions for each target SSB are obtained.

In an embodiment, the operation that the multiple sendable positions for each target SSB are obtained may include that:
based on a position where a set signal configured to determine an index of each target SSB is located, cyclic shift that is of a symbol level is performed on other signals than the set signal in each target SSB to obtain the multiple sendable positions for each target SSB, wherein the set signal has a same position in the multiple sendable positions with a position in the target SSB; and
the operation that the multiple SSBs are grouped may include that:
each target SSB and multiple SSBs corresponding to the multiple sendable positions obtained after the cyclic shift are classified into one group.

In an embodiment, the operation that the multiple sendable positions for each target SSB are obtained may include that:
signals in each target SSB are overall shifted based on a position of each target SSB to obtain the multiple sendable positions for each target SSB; and
the operation that the multiple SSBs are grouped may include that:
each target SSB and multiple SSBs corresponding to the multiple sendable positions obtained after the overall shifting are classified into one group.

In an embodiment, the operation that at most one SSB in each SSB group to be sent is sent to the UE may include that:
a first SSB in each SSB group to be sent is taken as a present SSB;
channel detection is performed prior to a sending position for the present SSB;
the present SSB is sent in response to a channel being idle; and
in response to a channel being busy, an SSB next to the present SSB is taken as the present SSB, and the operation that the channel detection is performed prior to the sending position for the present SSB is continuously executed till an SSB is successfully sent or channels prior to sending positions for all SSBs in a corresponding SSB group to be sent are all busy.

In an embodiment, the grouping rule may include at least one of: the number of beams, the number of the multiple SSBs, time-domain position distribution information of the multiple SSBs, a window size or a channel condition.

In an embodiment, the operation that the SSB sent by the base station is received and detected may include that:
the SSB sent by the base station is received;
a set signal configured to determine an SSB index in the SSB is detected to obtain a position where the set signal is located;
a signal group in a preset time window is acquired based on the position where the set signal is located;
position information of the SSB is determined based on the signal group; and
an index of the SSB is determined based on the position information.

In an embodiment, the operation that the SSB sent by the base station is received and detected may include that:
the SSB sent by the base station is received;
a target signal in the SSB is detected to acquire all signals in the SSB; and
all the signals in the SSB are demodulated to obtain an index of the SSB.

In an embodiment, the operation that the primary SSB in the SSB group corresponding to the detected SSB is determined may include that:

the SSB group corresponding to the detected SSB is determined based on a grouping rule; and the primary SSB in the SSB group is determined based on a primary SSB selecting rule.

In an embodiment, the method may further include that:

the grouping rule and the primary SSB selecting rule are defaulted; or the grouping rule and the primary SSB selecting rule are received from the base station.

In an embodiment, the operation that the signal group in the preset time window is acquired based on the position where the set signal is located may include that:

a symbol prior to or after a symbol where the set signal is located is determined as a present symbol;

whether the set signal and a signal on the present symbol are matched with a content of the SSB is determined, wherein the content of the SSB includes a content of the SSB before the SSB is subjected to cyclic shift and a content of the SSB after the SSB is subjected to the cyclic shift;

when matched, the signal on the present symbol is added to the signal group, a total number of present symbols is counted, and when the total number does not reach a first preset number, the present symbol and a symbol prior to the present symbol are taken or the present signals and a symbol after the present symbol are taken as the present symbols, and the operation that whether signals on the present symbols and the set signal are matched with the content of the SSB is determined is repeatedly executed till the total number reaches the first preset number; and when not matched, detection of a symbol prior to a symbol presently added to the signal group or a symbol after a symbol presently added to the signal group is terminated.

In an embodiment, the operation that the position information of the SSB is determined based on the signal group may include that:

all signals at a second preset number of continuous symbols including the symbol where the set signal is located in the signal group are respectively taken to match with the content of the SSB, wherein the content of the SSB includes the content of the SSB before the SSB is subjected to the cyclic shift and the content of the SSB after the SSB is subjected to the cyclic shift;

when there is one signal successfully matched at the second preset number of continuous symbols, the second preset number of continuous symbols that are successfully matched are taken as the position information; or when there are multiple signals successfully matched at the second preset number of continuous symbols, every second preset number of continuous symbols starting from a last symbol of the signal group are classified into one group, and symbols corresponding to a group including the symbol where the set signal is located are taken as the position information.

In an embodiment, the operation that the target signal in the SSB is detected to acquire all signals in the SSB may include that: the target signal in the SSB is detected to obtain a position where the target signal is located; and all the signals in the SSB are acquired based on the position where the target signal is located.

In an embodiment, the apparatus may further include:

a default module, configured to default a grouping rule and a primary SSB selecting rule before the grouping and selecting module groups the multiple SSBs and selects the primary SSB from each SSB group; or a determining and sending module, configured to, before the grouping and selecting module groups the multiple SSBs and selects the primary SSB from each SSB group, determine a grouping rule and a primary SSB selecting rule and send the grouping rule and the primary SSB selecting rule to the UE.

In an embodiment, the apparatus may further include:

a selecting and obtaining module, configured to, before the grouping and selecting module groups the multiple SSBs, select at least one SSB from the multiple SSBs as a target SSB and obtain multiple sendable positions for each target SSB.

In an embodiment, the selecting and obtaining module is configured to:

perform, based on a position where a set signal configured to determine an index of each target SSB is located, cyclic shift that is of a symbol level on other signals than the set signal in each target SSB to obtain the multiple sendable positions for each target SSB, wherein the set signal has a same position in the multiple sendable positions with a position in the target SSB; and the grouping and selecting module is configured to:

classify each target SSB and multiple SSBs corresponding to the multiple sendable positions obtained after the cyclic shift into one group.

In an embodiment, the selecting and obtaining module is configured to:

overall shift signals in each target SSB based on a position of each target SSB to obtain the multiple sendable positions for each target SSB; and the grouping and selecting module is configured to:

classify each target SSB and multiple SSBs corresponding to the multiple sendable positions obtained after the overall shifting into one group.

In an embodiment, the second sending module may include:

a determining submodule, configured to take a first SSB in each SSB group to be sent as a present SSB;

a detecting submodule, configured to perform channel detection prior to a sending position for the present SSB determined by the determining submodule;

a sending submodule, configured to send the present SSB in response to the detecting submodule detecting that a channel is idle; or a processing submodule, configured to take an SSB next to the present SSB as the present SSB in response to the detecting submodule detecting that a channel is busy, and continuously call the detecting submodule to perform the channel detection prior to the sending position for the present SSB till an SSB is successfully sent or channels prior to sending positions for all SSBs in a corresponding SSB group to be sent are all busy.

In an embodiment, the grouping rule includes at least one of: the number of beams, the number of the multiple SSBs, time-domain position distribution information of the multiple SSBs, a window size or a channel condition.

In an embodiment, the receiving and detecting module may include:

a first receiving submodule, configured to receive the SSB from the base station;

a detection obtaining submodule, configured to detect a set signal configured to determine an SSB index in the SSB received by the first receiving submodule to obtain a position where the set signal is located;

an acquiring submodule, configured to acquire a signal group in a preset time window based on the position where the set signal is located and that is obtained by the detection obtaining submodule;

a first determining submodule, configured to determine position information of the SSB based on the signal group acquired by the acquiring submodule; and a second determining submodule, configured to determine an index of the SSB based on the position information determined by the first determining submodule.

In an embodiment, the receiving and detecting module may include:

a second receiving submodule, configured to receive the SSB from the base station;

a detecting submodule, configured to detect a target signal in the SSB received by the second receiving submodule to acquire all signals in the SSB; and a demodulating module, configured to demodulate all the signals acquired by the detecting submodule in the SSB to obtain an index of the SSB.

In an embodiment, the determining module may include:

a third determining submodule, configured to determine the SSB group corresponding to the detected SSB based on a grouping rule; and a fourth determining submodule, configured to determine, based on a primary SSB selecting rule, the primary SSB in the SSB group determined by the third determining submodule.

In an embodiment, the apparatus may further include:

a default module, configured to default the grouping rule and the primary SSB selecting rule; or a receiving module, configured to receive the grouping rule and the primary SSB selecting rule from the base station.

In an embodiment, the acquiring submodule may include:

a determining unit, configured to determine a symbol prior to or after a symbol where the set signal is located as a present symbol;

a matching unit, configured to determine whether the set signal and a signal on the present symbol determined by the determining unit are matched with a content of the SSB, wherein the content of the SSB includes a content of the SSB before the SSB is subjected to cyclic shift and a content of the SSB after the SSB is subjected to the cyclic shift;

an adding and counting unit, configured to, when a result from the matching unit is matching, add the signal on the present symbol to the signal group, count a total number of present symbols, and correspondingly take the present symbol and a symbol prior to the present symbol or take the present signal and a symbol after the present symbol as the present symbols when the total number does not reach a first preset number, and repeatedly call the matching unit to determine whether signals on the present symbols and the set signal are matched with the content of the SSB till the total number reaches the first preset number; or a detection terminating unit, configured to, when a result from the matching unit is mismatching, terminate detection of a symbol prior to a symbol presently added to the signal group or a symbol after a symbol presently added to the signal group.

In an embodiment, the first determining submodule may include:

a matching unit, configured to respectively match all signals at a second preset number of continuous symbols including the symbol where the set signal is located in the signal group with the content of the SSB, wherein the content of the SSB includes the content of the SSB before the SSB is subjected to the cyclic shift and the content of the SSB after the SSB is subjected to the cyclic shift;

a first determining unit, configured to, when there is one signal successfully matched by the matching unit at the second preset number of continuous symbols, take the second preset number of continuous symbols that are successfully matched as the position information; or a second determining module, configured to, when there are multiple signals successfully matched by the matching unit at the second preset number of continuous symbols, classify every second preset number of continuous 4 symbols starting from a last symbol of the signal group into one group, and take symbols corresponding to a group including the symbol where the set signal is located as the position information.

In an embodiment, the detecting submodule may include:

a detecting unit, configured to detect the target signal in the SSB to obtain a position where the target signal is located; and an acquiring unit, configured to acquire all the signals in the SSB based on the position where the target signal is located and that is obtained by the detecting unit.

The technical solutions provided by the embodiments of the present disclosure may have the following beneficial effects.

By grouping multiple SSBs and sending at most one SSB in each SSB group to be sent to UE, each SSB in the SSB groups corresponds to an RO resource, that is, the number of RO resources corresponding to each SSB is increased, and thus the utilization rate of RO resources is improved, and the success rate of RA of the UE is improved.

By receiving an SSB from a base station, detecting a set signal configured to determine an SSB index in the SSB to obtain a position where the set signal is located, acquiring a signal group in a preset time window based on the position where the set signal is located, determining the position information of the SSB based on the signal group and then determining an index of the SSB based on the determined position information, the determined index of the SSB can have a high accuracy.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for configuring Random Access (RA), applied to a base station, comprising:

grouping multiple Synchronization Signal Blocks (SSBs) and selecting a primary SSB from each SSB group;

sending indication information to User Equipment (UE), the indication information indicating a primary SSB to be sent in an SSB group to be sent;

sending at most one SSB in each SSB group to be sent to the UE; and sending the number of SSBs corresponding to preambles in each Random Access Channel (RACH) Occasion (RO) and the number of ROs under Frequency Division Multiplexing (FDM) to the UE, to enable the UE to determine corresponding RO and preamble of the primary SSB based on the SSB to be sent by the base station, a position of the primary SSB in the SSB to be sent by the base station, the number of SSBs corresponding to preambles in each RO and the number of ROs under the FDM, to realize RA to the base station.

2. The method of claim 1, further comprising:
defaulting a grouping rule and a primary SSB selecting rule before grouping the multiple SSBs and selecting the primary SSB from each SSB group; or
determining a grouping rule and a primary SSB selecting rule before grouping the multiple SSBs and selecting the primary SSB from each SSB group, and sending the grouping rule and the primary SSB selecting rule to the UE.

3. The method of claim 2, wherein the grouping rule comprises at least one of:
the number of beams, the number of the multiple SSBs, time-domain position distribution information of the multiple SSBs, a window size or a channel condition.

4. The method of claim 1, further comprising:
selecting at least one SSB from the multiple SSBs as a target SSB and obtaining multiple sendable positions for each target SSB, before grouping the multiple SSBs.

5. The method of claim 4, wherein obtaining the multiple sendable positions for each target SSB comprises:
performing, based on a position where a set signal configured to determine an index of each target SSB is located, cyclic shift of a symbol level on other signals than the set signal in each target SSB to obtain the multiple sendable positions for each target SSB, wherein the set signal has a same position in the multiple sendable positions with a position in the target SSB; and
wherein grouping the multiple SSBs comprises:
classifying each target SSB and multiple SSBs corresponding to the multiple sendable positions obtained after the cyclic shift into one group.

6. The method of claim 4,
wherein obtaining the multiple sendable positions for each target SSB comprises:
obtain the multiple sendable positions for each target SSB by overall shifting signals in each target SSB based on a position of each target SSB; and
wherein grouping the multiple SSBs comprises:
classifying each target SSB and multiple SSBs corresponding to the multiple sendable positions obtained after the overall shifting into one group.

7. The method of claim 1, wherein sending at most one SSB in each SSB group to be sent to the UE comprises:
taking a first SSB in each SSB group to be sent as a present SSB;
performing channel detection prior to a sending position for the present SSB;
sending the present SSB in response to a channel being idle; or
taking a SSB next to the present SSB as the present SSB in response to the channel being busy, and continuously performing the channel detection prior to the sending position for the present SSB till an SSB is successfully sent or channels prior to sending positions for all SSBs in a corresponding SSB group to be sent are all busy.

8. A non-transitory computer-readable storage medium, storing computer instructions that, when executed by a processor, implement the operations of the method for Random Access (RA) configuration according to claim 1.

9. A method for Random Access (RA), applied to User Equipment (UE), comprising:
receiving and detecting a Synchronization Signal Block (SSB) from a base station;
determining a primary SSB in an SSB group corresponding to the detected SSB;
receiving indication information from the base station, and determining, based on the indication information, an SSB to be sent by the base station;
receiving the number of SSBs corresponding to preambles in each Random Access Channel (RACH) Occasion (RO) and the number of ROs under Frequency Division Multiplexing (FDM) from the base station, and determining corresponding RO and preamble of the primary SSB based on the SSB to be sent by the base station, a position of the primary SSB in the SSB to be sent by the base station, the number of SSBs corresponding to the preambles in each RO and the number of ROs under the FDM; and
sending the corresponding preamble to the base station on the determined RO to realize RA to the base station.

10. The method of claim 9, wherein receiving and detecting the SSB from the base station comprises:
receiving the SSB from the base station;
detecting a set signal configured to determine an SSB index in the SSB to obtain a position where the set signal is located;
acquiring a signal group in a preset time window based on the position where the set signal is located;
determining position information of the SSB based on the signal group; and
determining an index of the SSB based on the position information.

11. The method of claim 10, wherein acquiring the signal group in the preset time window based on the position where the set signal is located comprises:
determining a symbol prior to or after a symbol where the set signal is located as a present symbol;
determining whether the set signal and a signal on the present symbol are matched with a content of the SSB, wherein the content of the SSB comprises a content of the SSB before the SSB is subjected to cyclic shift and a content of the SSB after the SSB is subjected to the cyclic shift;
when matched, adding the signal on the present symbol to the signal group, counting a total number of present symbols, and taking the present symbol and a symbol prior to the present symbol or taking the present signal and a symbol after the present symbol as the present symbols when the total number does not reach a first preset number, and repeatedly determining whether signals on the present symbols and the set signal are matched with the content of the SSB till the total number reaches the first preset number; or
when not matched, terminating detection of a symbol prior to a symbol presently added to the signal group or a symbol after a symbol presently added to the signal group.

12. The method of claim 11, wherein determining the position information of the SSB based on the signal group comprises:
respectively matching all signals at a second preset number of continuous symbols comprising the symbol where the set signal is located in the signal group with the content of the SSB, wherein the content of the SSB comprises the content of the SSB before the SSB is subjected to the cyclic shift and the content of the SSB after the SSB is subjected to the cyclic shift;

when there is one signal successfully matched at the second preset number of continuous symbols, taking the second preset number of continuous symbols that are successfully matched as the position information; or when there are multiple signals successfully matched at the second preset number of continuous symbols, classifying every second preset number of continuous symbols starting from a last symbol of the signal group into one group, and taking symbols corresponding to a group comprising the symbol where the set signal is located as the position information.

13. The method of claim 9, wherein receiving and detecting the SSB from the base station comprises:
receiving the SSB from the base station;
detecting a target signal in the SSB to acquire all signals in the SSB; and
demodulating all signals in the SSB to obtain an index of the SSB.

14. The method of claim 13, wherein detecting the target signal in the SSB to acquire all the signals in the SSB comprises:
detecting the target signal in the SSB to obtain a position where the target signal is located; and
acquiring all the signals in the SSB based on the position where the target signal is located.

15. The method of claim 9, wherein determining the primary SSB in the SSB group corresponding to the detected SSB comprises:
determining the SSB group corresponding to the detected SSB based on a grouping rule; and
determining the primary SSB in the SSB group based on a primary SSB selecting rule.

16. The method of claim 15, further comprising:
defaulting the grouping rule and the primary SSB selecting rule; or
receiving the grouping rule and the primary SSB selecting rule from the base station.

17. A non-transitory computer-readable storage medium, storing computer instructions that, when executed by a processor, implement the operations of the method for Random Access (RA) according to claim 9.

18. A base station, comprising:
a processor; and
a memory, configured to store instructions executable by the processor,
wherein the processor is configured to:
group multiple Synchronization Signal Blocks (SSBs) and select a primary SSB from each SSB group;
send indication information to User Equipment (UE), the indication information indicating a primary SSB to be sent in an SSB group to be sent;
send at most one SSB in each SSB group to be sent to the UE; and
send the number of SSBs corresponding to preambles in each Random Access Channel (RACH) Occasion (RO) and the number of ROs under Frequency Division Multiplexing (FDM) to the UE, to enable the UE to determine corresponding RO and preamble of the primary SSB based on the SSB to be sent by the base station, a position of the primary SSB in the SSB to be sent by the base station, the number of SSBs corresponding to preambles in each RO and the number of ROs under the FDM, to realize RA to the base station.

19. User Equipment (UE), comprising:
a processor; and
a memory, configured to store instructions executable by the processor,
wherein the processor is configured to:
receive and detect a Synchronization Signal Block (SSB) from a base station;
determine a primary SSB in an SSB group corresponding to the detected SSB;
receive indication information from the base station, and determine, based on the indication information, an SSB to be sent by the base station;
receive a number of SSBs corresponding to preambles in each Random Access Channel (RACH) Occasion (RO) and a number of ROs under Frequency Division Multiplexing (FDM) from the base station, and determine corresponding RO and preamble of the primary SSB based on the SSB to be sent by the base station, a position of the primary SSB in the SSB to be sent by the base station, the number of SSBs corresponding to the preambles in each RO and the number of ROs under the FDM; and
send the corresponding preamble to the base station on the determined RO to realize RA to the base station.

* * * * *